US011775559B1

(12) United States Patent
Arikatla et al.

(10) Patent No.: US 11,775,559 B1
(45) Date of Patent: Oct. 3, 2023

(54) DISTRIBUTING LARGE AMOUNTS OF GLOBAL METADATA USING OBJECT FILES

(71) Applicant: Snowflake Inc., Bozeman, MT (US)

(72) Inventors: Durga Mahesh Arikatla, San Jose, CA (US); Subramanian Muralidhar, Mercer Island, WA (US); Vishnu Dutt Paladugu, Seattle, WA (US); Shakhina Pulatova, San Francisco, CA (US); Di Wu, Newark, CA (US); Ziqi Xu, San Mateo, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/977,817

(22) Filed: Oct. 31, 2022

Related U.S. Application Data

(60) Provisional application No. 63/377,860, filed on Sep. 30, 2022.

(51) Int. Cl.
*G06F 16/27* (2019.01)
*G06Q 30/0201* (2023.01)
*G06Q 30/0601* (2023.01)

(52) U.S. Cl.
CPC ......... *G06F 16/27* (2019.01); *G06Q 30/0206* (2013.01); *G06Q 30/0601* (2013.01)

(58) Field of Classification Search
CPC ....................................................... G06F 16/27
USPC ......................................................... 707/609
See application file for complete search history.

(56) References Cited

U.S. PATENT DOCUMENTS

| | | | | |
|---|---|---|---|---|
| 10,855,660 B1 * | 12/2020 | Gernhardt | ............. | G06F 16/256 |
| 11,144,511 B1 * | 10/2021 | Chu | .................... | G06F 16/1844 |
| 11,468,087 B1 * | 10/2022 | Slember | .................. | G06F 9/547 |
| 2015/0186484 A1 * | 7/2015 | Shang | ..................... | G06F 16/27 |
| | | | | 707/634 |
| 2018/0121116 A1 * | 5/2018 | Wang | .................... | G06F 3/0619 |

* cited by examiner

*Primary Examiner* — Muluemebet Gurmu
(74) *Attorney, Agent, or Firm* — Schwegman Lundberg & Woessner, P.A.

(57) ABSTRACT

A data dictionary generation system automatically populates and updates a data dictionary for listings offering shared data. The data listing distribution component distributes the data dictionaries to various remote deployments in a data exchange by using a global messaging framework and replication method. For example, the data listing distribution component replicates a data dictionary generated for the listing and its shared data from a source deployment to one or more destination deployments associated with various geographic regions. The data listing distribution component distributes the listing to the various remote deployments to allow for the listing, including its shared data and data dictionary, to be accessed by users within the geographic region associated with the remote deployment.

30 Claims, 26 Drawing Sheets

1300

GENERATE METADATA DESCRIBING A SET OF DATA OBJECTS INCLUDES IN SHARED DATA OFFERED BY A LISTING
1302

GENERATE METADATA DESCRIBING EACH INDIVIDUAL DATA OBJECT INCLUDED IN THE SET OF DATA OBJECTS
1304

GENERATE A DATA DICTIONARY FOR THE LISTING BASED ON THE METADATA DESCRIBING THE SET OF DATA OBJECTS AND THE METADATA DESCRIBING EACH INDIVIDUAL DATA OBJECT INCLUDED IN THE SET OF DATA OBJECTS
1306

```
┌─────────────────────────────────────────────────────────────────┐
│   GENERATE METADATA DESCRIBING A TABLE INCLUDED IN SHARED DATA  │
│                     OFFERED BY A LISTING                        │
│                            1402                                 │
└─────────────────────────────────────────────────────────────────┘
                                 │
                                 ▼
┌─────────────────────────────────────────────────────────────────┐
│  GENERATE METADATA DESCRIBING EACH INDIVIDUAL COLUMN INCLUDED IN│
│                            THE TABLE                            │
│                              1404                               │
└─────────────────────────────────────────────────────────────────┘
                                 │
                                 ▼
┌─────────────────────────────────────────────────────────────────┐
│   GENERATE A PORTION OF THE DATA DICTIONARY FOR THE LISTING THAT│
│  DESCRIBES THE TABLE BASED ON THE METADATA DESCRIBING THE TABLE │
│  AND THE METADATA DESCRIBING EACH INDIVIDUAL COLUMN INCLUDED IN │
│                            THE TABLE                            │
│                              1406                               │
└─────────────────────────────────────────────────────────────────┘
```

*FIG. 14*

ECONOMY DATA ATLAS
KNOEMA

THE ECONOMY DATA ATLAS GIVES YOU A LOOK AT ECONOMIC AND FINANCIAL DEVELOPMENTS AND MACROECONOMIC INDICATORS THAT HELP SHAPE MARKET TRENDS, INCLUDING ECONOMIC OUTLOOKS, NATIONAL ACCOUNTS, LABOR MARKET, BALANCE OF PAYMENTS, FOREIGN DIRECT INVESTMENT, SHORT TERM, AND LEADING INDICATORS, PRODUCTIVITY, GOVERNMENT FINANCE, EXCHANGE RATES, AND COMMODITY PRICES.

TOPICS COVERED:
- NATIONAL ACCOUNTS
- FINANCIAL SECTOR
- ECONOMIC OUTLOOK
- LABOR MARKET
- PRICES
- SHORT-TERM AND LEADING INDICATORS
- BALANCE OF PAYMENTS

SHOW MORE ⌄

---

FREE
✓ UNLIMITED ACCESS

GET

🔖 COMMERCE

? HELP
CONTACT KNOEMA ↗
DOCUMENTATION ↗
SUPPORT ↗

↻ REFRESHES
HOURLY

📅 TIME COVERAGE
NEXT 6 MONTHS
BY WEEK

📍 GEOGRAPHIC COVERAGE
GLOBAL
BY COUNTY

👤 ABOUT KNOEMA
KNOEMA IS THE MOST COMPREHENSIVE SOURCE OF GLOBAL DECISION-MAKING DATA IN THE WORLD. OUR DATA...

SHOW MORE ⌄

---

BUSINESS NEEDS   VIEW ALL OBJECTS

QUANTITATIVE ANALYSIS
THE KNOEMA ECONOMY DATA ATLAS PROVIDES DATA FOR MACROECONOMIC ANALYSIS, MODELING, AND FORECASTING FOR MORE THAN 200 ECONOMIES.

DATA DICTIONARY

( 🗃 DATASETS )  ( 🗃 DATA_ATLAS )  ( 🗃 AB=DBMFW4A )
( 🗃 BNABOP2021 )  ( 🗃 BEANIPA )

THIS IS A REFERENCE TABLE THAT INCLUDES THE LIST OF ALL TABLES/DATASETS INCLUDED IN THIS LISTING, WITH KEY DETAILS ON EACH TABLE/DATASET INCLUDING NAME, SOURCE, FREQUENCY OF REFRESH, SOURCE, DOCUMENTATION ON DATA, ETC.

| NAME | TYPE | DESCRIPTION |
|---|---|---|
| DATASETID | AA VARCAR | — |
| DATASETNAME | AA VARCAR | — |
| FREQUENCIES | 🕐 DATE | — |
| FIRSTDATE | 🕐 DATE | — |
| LASTDATE | 🕐 DATE | — |
| PUBLICATIONDATE | 🕐 DATE | — |
| LASTUPDATEDATE | 🕐 DATE | — |
| NEXT RELEASE DATE | 🕐 DATE | — |
| URL | AA VARCAR | — |
| SOURCE | AA VARCAR | — |

SHOW ALL COLUMNS ⌄

< LISTINGS      🗑 PREVIEW | SUBMIT FOR APPROVAL

ECONOMY DATA ATLAS

LISTING    CONSUMER REQUESTS    SETTINGS

---

BASIC INFORMATION

| | |
|---|---|
| TYPE | STANDARD |
| PUBLISHING AS | KNOEMA |
| TITLE | ECONOMY DATA ATLAS |
| SUBTITLE | TEST |
| CATEGORY | COMMERCE |
| TERMS OF SERVICE | STANDARD AGREEMENT FOR MARKETPLACE PRODUCTS |

2002

DETAILS

| | |
|---|---|
| DESCRIPTION | THE ECONOMY DATA ATLAS GIVES YOU A LOOK AT ECONOMIC AND FINANCIAL DEVELOPMENTS AND MACROECONOMIC INDICATORS THAT HELP SHAPE MARKET TRENDS, INCLUDING ECONOMIC OUTLOOKS, NATIONAL ACCOUNTS, LABOR MARKET, BALANCE PAYMENTS, FOREIGN DIRECT INVESTMENT, SHORT TERM, AND LEADING INDICATORS, PRODUCTIVITY, G... MORE |
| LINK TO DOCUMENTATION | HTTPS://KNOEMA.COM/ATLAS/TOPICS/ECONOMY |

2004

DATA PRODUCT

| | |
|---|---|
| SECURE SHARE | KNOEMA_ECONOMY_DATA_ATLAS_SNOWFLAKE_SECURE_SHARE_1664484550391 |
| FEATURED OBJECTS | ☐ DATASETS   ☐ DATA_ATLAS   🗂 AB=DBMFW4A    🗂 BEANIPA   🗂 BNABOP2021 |
| SUBTITLE | ✓ DATA UPDATED HOURLY<br>✓ DATA FOR GLOBAL AT COUNTRY LEVEL<br>✓ DATA FOR THE NEXT 6 MONTHS WITH WEEKLY INTERVAL |

DISTRIBUTING LARGE AMOUNTS OF GLOBAL METADATA USING OBJECT FILES

CROSS REFERENCE TO RELATED APPLICATIONS

The present application claims the benefit of priority of U.S. Provisional Application No. 63/377,860, filed on Sep. 30, 2022, which is incorporated herein be reference in its entirety.

TECHNICAL FIELD

The present disclosure relates to data sharing, and particularly to distributing metadata describing shared data.

BACKGROUND

Data sharing platforms, including databases, are widely used for data storage and access in computing applications. Databases may include one or more tables that include or reference data that can be read, modified, or deleted using queries. Databases may be used for storing and/or accessing personal information or other sensitive information. Secure storage and access of database data may be provided by encrypting and/or storing data in an encrypted form to prevent unauthorized access. In some cases, data sharing may be desirable to let other parties perform queries against a set of data. Furthermore, it may be desirable for data providers to provide descriptions of the shared data for potential data consumers. For example, data describing the shared data, such as the included tables, columns, schemas and data types, provide data consumers information to determine what shared data is valuable to them and how to use it.

BRIEF DESCRIPTION OF THE DRAWINGS

The described embodiments and the advantages thereof may best be understood by reference to the following description taken in conjunction with the accompanying drawings.

These drawings in no way limit any changes in form and detail that may be made to the described embodiments by one skilled in the art without departing from the spirit and scope of the described embodiments.

FIG. 13 is a flow diagram of a method for generating metadata to populate a data dictionary, in accordance with some embodiments of the present invention.

FIG. 14 is a flow diagram of a method for generating metadata describing a table to populate a data dictionary, in accordance with some embodiments of the present invention.

FIG. 18 is a block diagram of a user interface presenting a description of a listing with a data dictionary, in accordance with some embodiments of the present invention.

FIG. 19 is a block diagram of another user interface presenting a description of a listing with a data dictionary, in accordance with some embodiments of the present invention.

FIG. 20 is a block diagram of a user interface presented to a data provider, in accordance with some embodiments of the present invention.

DETAILED DESCRIPTION

Figure 1A:
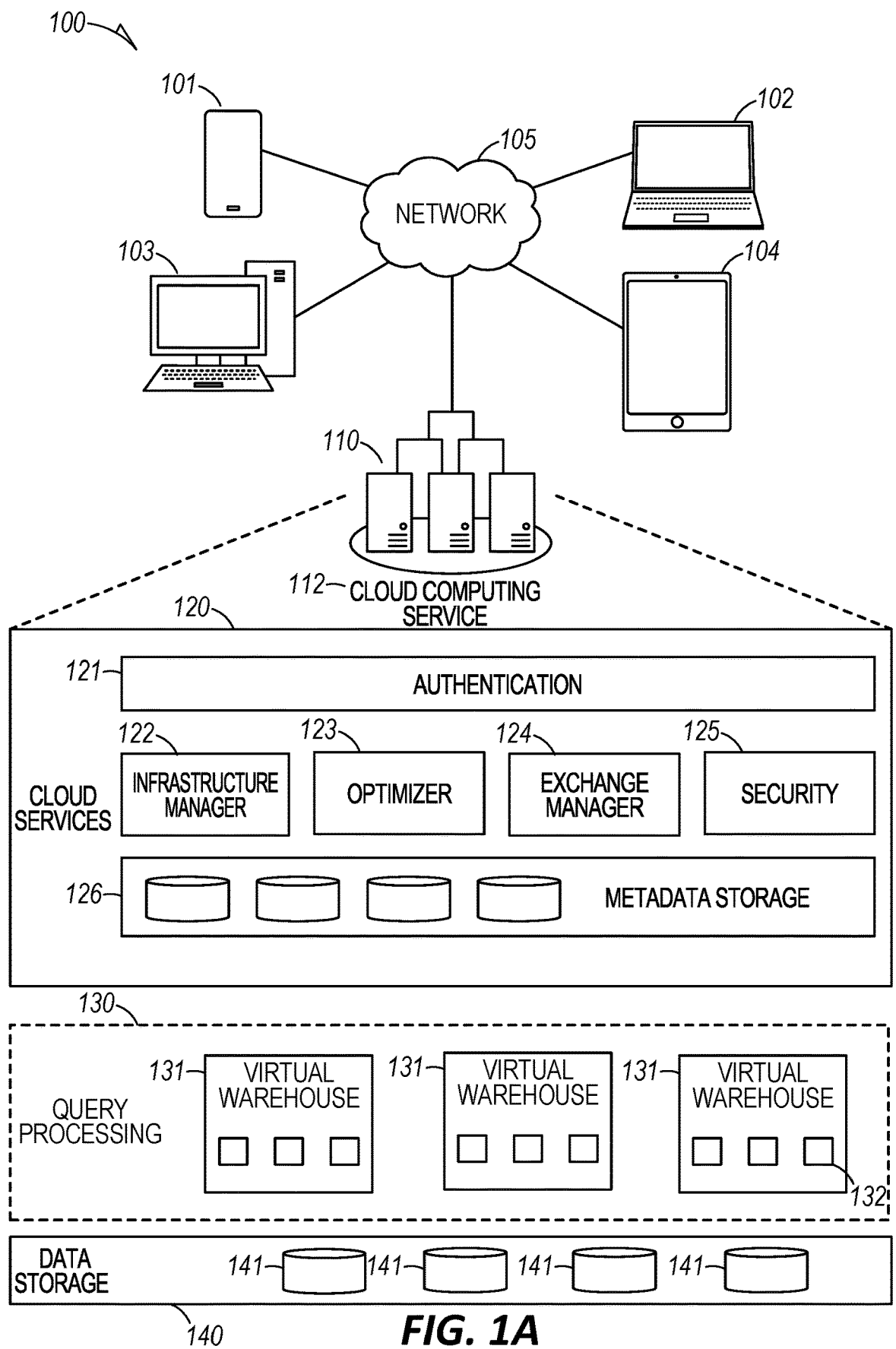
FIG. 1A is a block diagram depicting an example computing environment in which the methods disclosed herein may be implemented, in accordance with some embodiments of the present disclosure.

Data providers often have data assets that are cumbersome to share. A data asset may be data that is of interest to another entity. For example, a large online retail company may have a data set that includes the purchasing habits of millions of customers over the last ten years. This data set may be large. If the online retailer wishes to share all or a portion of this data with another entity (anonymized and/or aggregated, in accordance with applicable privacy laws and contractual obligations), the online retailer may need to use old and slow methods to transfer the data, such as a file-transfer-protocol (FTP), or even copying the data onto physical media and mailing the physical media to the other entity. This has several disadvantages. First, it is slow. Copying terabytes or petabytes of data can take days. Second, once the data is delivered, the sharer cannot control what happens to the data. The recipient can alter the data, make copies, or share it with other parties. Third, the only entities that would be interested in accessing such a large data set in such a manner are large corporations that can afford the complex logistics of transferring and processing the data as well as the high price of such a cumbersome data transfer. Thus, smaller entities (e.g., small and medium-sized businesses (SMBs), "mom and pop" shops, etc.) or even smaller, more nimble cloud-focused startups are often priced out of accessing this data, even though the data may be valuable to their businesses. This may be because raw data assets are generally too unpolished and full of potentially sensitive data to just outright sell to other companies. Data cleaning, de-identification, aggregation, joining, and other forms of data enrichment need to be performed by the owner of data before it is shareable with another party. This is time-consuming and expensive. Finally, it is difficult to share data assets with many entities because traditional data sharing methods do not allow scalable sharing for the reasons mentioned above. Traditional sharing methods also introduce latency and delays in terms of all parties having access to the most recently-updated data.

Private and public data exchanges may allow data providers to more easily and securely share their data assets with other entities. A public data exchange (also referred to herein as a "data marketplace") may provide a centralized repository with open access where a data provider may publish and control live and read-only data sets to thousands of customers. A private data exchange (also referred to herein as a "data exchange") may be under the data provider's brand, and the data provider may control who can gain access to it. The data exchange may be for internal use only, or may also be opened to customers, partners, suppliers, or others. The data provider may control what data assets are listed as well as control who has access to which sets of data. This allows for a seamless way to discover and share data both within a data provider's organization and with its business partners.

A data exchange may be facilitated by a cloud computing service such as SNOWFLAKE®, and allow data providers to offer data assets directly from their own online domain (e.g., website) in a private online marketplace with their own branding. The data exchange may provide a centralized, managed hub for an entity to list internally or externally-shared data assets, inspire data collaboration, and also to maintain data governance and audit access. With the data exchange, data providers may be able to share data without copying it between companies. Data providers may invite other entities to view their data listings, control which data listings appear in their private online marketplace, control who can access data listings and how others can interact with the data assets connected to the listings. This may be thought of as a "walled garden" marketplace, in which visitors to the garden must be approved and access to certain listings may be limited.

As an example, Company A may be a consumer data company that has collected and analyzed the consumption habits of millions of individuals in several different categories. Their data sets may include data in the following categories: online shopping, video streaming, electricity consumption, automobile usage, internet usage, clothing purchases, mobile application purchases, club memberships, and online subscription services. Company A may desire to offer these data sets (or subsets or derived products of these data sets) to other entities. For example, a new clothing brand may wish to access data sets related to consumer clothing purchases and online shopping habits. Company A may support a page on its website that is or functions substantially similar to a data exchange, where a data consumer (e.g., the new clothing brand) may browse, explore, discover, access and potentially purchase data sets directly from Company A. Further, Company A may control: who can enter the data exchange, the entities that may view a particular listing, the actions that an entity may take with respect to a listing (e.g., view only), and any other suitable action. In addition, a data provider may combine its own data with other data sets from, e.g., a public data exchange, and create new listings using the combined data.

A data exchange may be an appropriate place to discover, assemble, clean, and enrich data to make it more monetizable. A large company on a data exchange may assemble data from across its divisions and departments, which could become valuable to another company. In addition, participants in a private ecosystem data exchange may work together to join their datasets together to jointly create a useful data product that any one of them alone would not be able to produce. Once these joined datasets are created, they may be listed on the data exchange or on the data marketplace.

Sharing data may be performed when a data provider creates a share object (hereinafter referred to as a share) of a database in the data provider's account and grants the share access to particular objects (e.g., tables, secure views, secure user-defined functions (UDFs) and secure user-defined table functions (UDTFs)) of the database. Then, a read-only database may be created using information provided in the share. Access to this database may be controlled by the data provider. A "share" encapsulates all of the information required to share the data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. When data is shared, no data is copied or transferred between users. Sharing is accomplished through the cloud computing services of a cloud computing service provider.

Data that is shared by a provider (also referred to as a "data provider") may be described by listings defined by the provider in a data exchange or in a data marketplace. The access controls, management, and governance of the listings may be similar for both a data marketplace and a data exchange.

Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data but the actual shared data is not accessible by the data consumer (e.g., recipient of the share).

Each listing may include a description provided by the data provider that describes the shared data offered by the listing. For example, the description may include metadata describing the functions tables, columns, and data types included in the shared data. This description allows data consumers to understand the shared data provided by a listing, identify listings of interest to the data consumer, and allows data consumers to understand how to use the shared data provided by the listing. Generating and maintaining the description, however, is a laborious and time-consuming task. For example, a data provider must manually generate the description for each listing, which may include multiple tables, schemas, views, and functions. As a result, the provided description may not include enough detail for data consumers to understand the details of the shared data. Moreover, the shared data provided by a listing may evolve over time, requiring data providers to update the description. As a result, the description may become outdated and/or fail to properly describe the shared data provided by the listing.

To alleviate these issues, a data dictionary generation system automatically generates and updates a data dictionary defining the shared data included in each listing. A data dictionary includes metadata describing the shared data provided by the listing overall as well as metadata describing the individual objects included in the shared data, such as the individual tables, schemas, views, functions, and the like. The shared data provided by the listing and each individual data object included in the shared data may be described in the data dictionary by a set of data fields that corresponds to the shared data or the object type of the individual objects. For example, the set of data fields used to describe the listing may include a high-level summary of the shared data provided by the listing, such as the number of schemas, tables, views, functions, and/or stored procedures included in the shared data. The set of data fields used to describe an individual object may provide more specific data about the object and its contents. For example, the set of data fields used to describe a table may include information describing the table (e.g., table name, description, size, number of rows, number of columns), information describing each column in the table (e.g., name, description, data type, example value), column statistics (e.g., ranges of values, frequencies), and table previews. As another example, the set of data fields used to describe a function or stored procedure may include a name of the function or stored procedure, description, parameter names and parameter types.

The metadata populated to the data dictionary can be presented to data consumers along with the description of the listing when requested by data consumers. For example, the metadata populated to the data dictionary can be presented in a user interface along with the description when a data consumer selects to view a listing available through a data exchange. The data provided in the data dictionary provides data consumers with a comprehensive description of the shared data, including a high-level summary of the shared data and description of each individual object included in the shared data. The information included in the data dictionary allows data consumers to understand the contents of the shared data offered by the listing and how to use the shared data provided by the listing.

To generate the data dictionary for a listing, the data dictionary generation system analyzes the shared data provided by the listing to identify objects included in the shared data. The data dictionary generation system identifies a set of data fields associated with each identified object and populates the set of data fields associated with each identified object based on the shared data offered by the listing. For example, the data dictionary generation system may access the title of a table to populate a table name data field, count the number of columns included in a table to populate the number of columns data field, and the like. The data dictionary generated by the data dictionary generation system can be populated to a manifest file associated with the listing, which can be subsequently used to generate the description for the listing.

To ensure that a data dictionary for each listing is generated and remains up to date as the shared data included in the listing is updated, the data dictionary generation system periodically scans the listings to identify any changes to share access granted to the listings. For example, the data dictionary generation system determines whether a listing has been granted access to a new object, has had access to an object revoked, or whether access to an object has been modified. If a change to the share access granted to a listing is detected, the data dictionary generation system generates an updated data dictionary for the listing. The updated data dictionary is then populated to the manifest file associated with the listing to provide an updated description of the listing.

FIG. 1A is a block diagram of an example computing environment 100 in which the systems and methods disclosed herein may be implemented. In particular, a cloud computing platform 110 may be implemented, such as AMAZON WEB SERVICES™ (AWS), MICROSOFT AZURE™ GOOGLE CLOUD™, or the like. As known in the art, a cloud computing platform 110 provides computing resources and storage resources that may be acquired (purchased) or leased and configured to execute applications and store data.

The cloud computing platform 110 may host a cloud computing service 112 that facilitates storage of data on the cloud computing platform 110 (e.g. data management and access) and analysis functions (e.g. SQL queries, analysis), as well as other computation capabilities (e.g., secure data sharing between users of the cloud computing platform 110). The cloud computing platform 110 may include a three-tier architecture: data storage 140, query processing 130, and cloud services 120.

Data storage 140 may facilitate the storing of data on the cloud computing platform 110 in one or more cloud databases 141. Data storage 140 may use a storage service such as AMAZON S2 to store data and query results on the cloud computing platform 110. In particular embodiments, to load data into the cloud computing platform 110, data tables may be horizontally partitioned into large, immutable files which may be analogous to blocks or pages in a traditional database system. Within each file, the values of each attribute or column are grouped together and compressed using a scheme sometimes referred to as hybrid columnar. Each table has a header which, among other metadata, contains the offsets of each column within the file.

In addition to storing table data, data storage 140 facilitates the storage of temp data generated by query operations (e.g., joins), as well as the data contained in large query results. This may allow the system to compute large queries without out-of-memory or out-of-disk errors. Storing query results this way may simplify query processing as it removes the need for server-side cursors found in traditional database systems.

Query processing 130 may handle query execution within elastic clusters of virtual machines, referred to herein as virtual warehouses or data warehouses. Thus, query processing 130 may include one or more virtual warehouses 131, which may also be referred to herein as data warehouses. The virtual warehouses 131 may be one or more virtual machines operating on the cloud computing platform 110. The virtual warehouses 131 may be compute resources that may be created, destroyed, or resized at any point, on demand. This functionality may create an "elastic" virtual warehouse that expands, contracts, or shuts down according to the user's needs. Expanding a virtual warehouse involves generating one or more compute nodes 132 to a virtual warehouse 131. Contracting a virtual warehouse involves removing one or more compute nodes 132 from a virtual warehouse 131. More compute nodes 132 may lead to faster compute times. For example, a data load which takes fifteen hours on a system with four nodes might take only two hours with thirty-two nodes.

Cloud services 120 may be a collection of services that coordinate activities across the cloud computing service 112. These services tie together all of the different components of the cloud computing service 112 in order to process user requests, from login to query dispatch. Cloud services 120 may operate on compute instances provisioned by the cloud computing service 112 from the cloud computing platform 110. Cloud services 120 may include a collection of services that manage virtual warehouses, queries, transactions, data exchanges, and the metadata associated with such services, such as database schemas, access control information, encryption keys, and usage statistics. Cloud services 120 may include, but not be limited to, authentication engine 121, infrastructure manager 122, optimizer 123, exchange manager 124, security engine 125, and metadata storage 126.

Figure 1B:
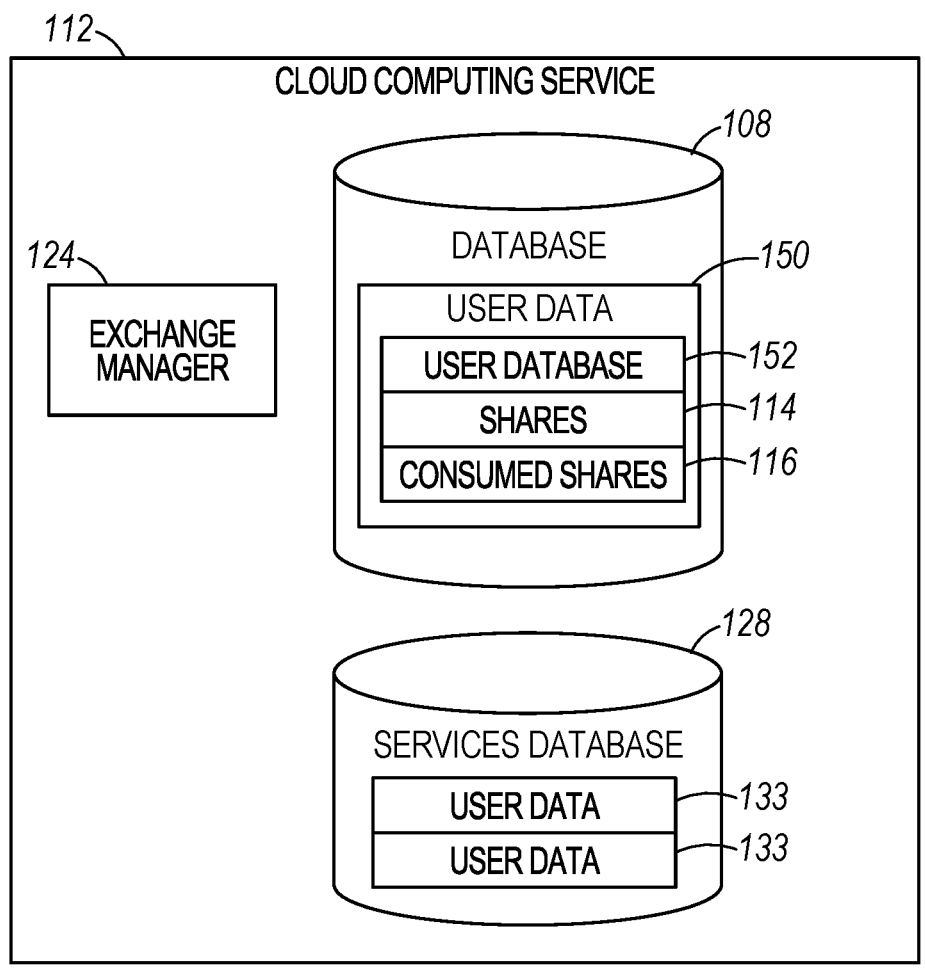
FIG. 1B is a block diagram illustrating components of the cloud computing service used to implement a public or private data exchange, in accordance with some embodiments of the present disclosure.

FIG. 1B is a block diagram illustrating components of the cloud computing service 112 used to implement a public or private data exchange, in accordance with some embodiments of the present disclosure. The exchange manager 124 may facilitate the sharing of data between data providers and data consumers, using, for example, a data exchange. For example, cloud computing service 112 may manage the storage and access of a database 108. The database 108 may include various instances of user data 150 for different users, e.g., different enterprises or individuals. The user data may include a user database 152 of data stored and accessed by that user. The user database 152 may be subject to access controls such that only the owner of the data is allowed to change and access the database 152 upon authenticating with the cloud computing service 112. For example, data may be encrypted such that it can only be decrypted using decryption information possessed by the owner of the data. Using the exchange manager 124, specific data from a user database 152 that is subject to these access controls may be shared with other users in a controlled manner according to the methods disclosed herein. In particular, a user may specify shares 154 that may be shared in a public or private data exchange in an uncontrolled manner or shared with specific other users in a controlled manner as described above. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. When data is shared, no data is copied or transferred between users. Sharing is accomplished through the cloud services 120 of the cloud computing service 112.

Sharing data may be performed when a data provider creates a share of a database in the data provider's account and grants access to particular objects (e.g., tables, secure views, and secure user-defined functions (UDFs)). Then a read-only database may be created using information provided in the share. Access to this database may be controlled by the data provider.

Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data but the actual shared data is not accessible by the data consumer (e.g., recipient of the share). A secure join may be performed as described in U.S. application Ser. No. 16/368,339, filed Mar. 18, 2019.

User devices 101-104, such as laptop computers, desktop computers, mobile phones, tablet computers, cloud-hosted computers, cloud-hosted serverless processes, or other computing processes or devices may be used to access the virtual warehouse 131 or cloud service 120 by way of a network 105, such as the Internet or a private network.

In the description below, actions are ascribed to users, particularly consumers and providers. Such actions shall be understood to be performed with respect to devices 101-104 operated by such users. For example, notification to a user may be understood to be a notification transmitted to devices 101-104, an input or instruction from a user may be understood to be received by way of the user's devices 101-104, and interaction with an interface by a user shall be understood to be interaction with the interface on the user's devices 101-104. In addition, database operations (joining, aggregating, analysis, etc.) ascribed to a user (consumer or provider) shall be understood to include performing such actions by the cloud computing service 112 in response to an instruction from that user.

Figure 2:
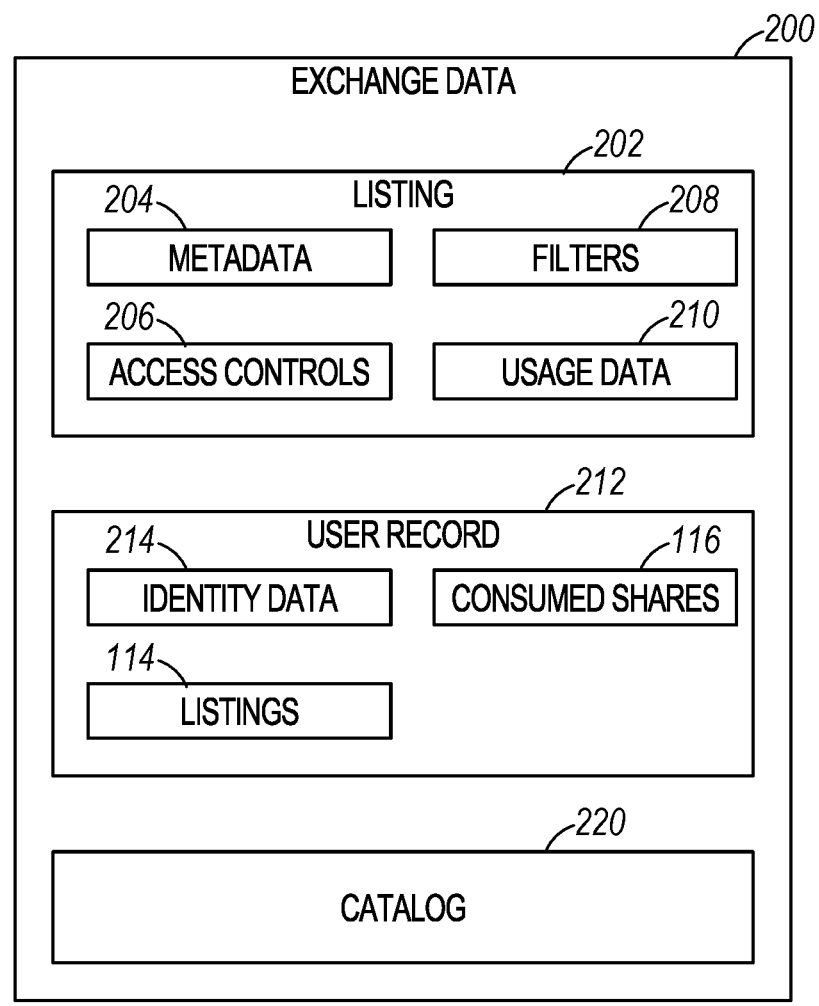
FIG. 2 is a schematic block diagram of data that may be used to implement a public or private data exchange, in accordance with some embodiments of the present disclosure.

FIG. 2 is a schematic block diagram of data that may be used to implement a public or private data exchange in accordance with an embodiment of the present invention. The exchange manager 124 may operate with respect to some or all of the illustrated exchange data 200, which may be stored on the platform executing the exchange manager 124 (e.g., the cloud computing platform 110) or at some other location. The exchange data 200 may include a plurality of listings 202 describing data that is shared by a first user ("the provider"). The listings 202 may be listings in a data exchange or in a data marketplace. The access controls, management, and governance of the listings may be similar for both a data marketplace and a data exchange.

A listing 202 may include metadata 204 describing the shared data. The metadata 204 may be data provided (e.g., manually entered) by a data provider to describe the shared data. For example, the metadata 204 may include some or all of the following information: an identifier of the sharer (e.g., data provider) of the shared data, a URL associated with the sharer, a name of the share, a name of tables, a category to which the shared data belongs, an update frequency of the shared data, a catalog of the tables, a number of columns and a number of rows in each table, as well as name for the columns. The metadata 204 may also include examples to aid a user in using the data. Such examples may include sample tables that include a sample of rows and columns of an example table, example queries that may be run against the tables, example views of an example table, example visualizations (e.g., graphs, dashboards) based on a table's data. Other information included in the metadata 204 may be metadata for use by business intelligence tools, text description of data contained in the table, keywords associated with the table to facilitate searching, a link (e.g., URL) to documentation related to the shared data, and a refresh interval indicating how frequently the shared data is updated along with the date the data was last updated.

The listing 202 may include access controls 206, which may be configurable to any suitable access configuration. For example, access controls 206 may indicate that the shared data is available to any member of the private exchange without restriction (an "any share" as used elsewhere herein). The access controls 206 may specify a class of users (members of a particular group or organization) that are allowed to access the data and/or see the listing. The access controls 206 may specify that a "point-to-point" share (see discussion of FIGS. 4A & 4B) in which users may request access but are only allowed access upon approval of the provider. The access controls 206 may specify a set of user identifiers of users that are excluded from being able to access the data referenced by the listing 202.

Figure 6:
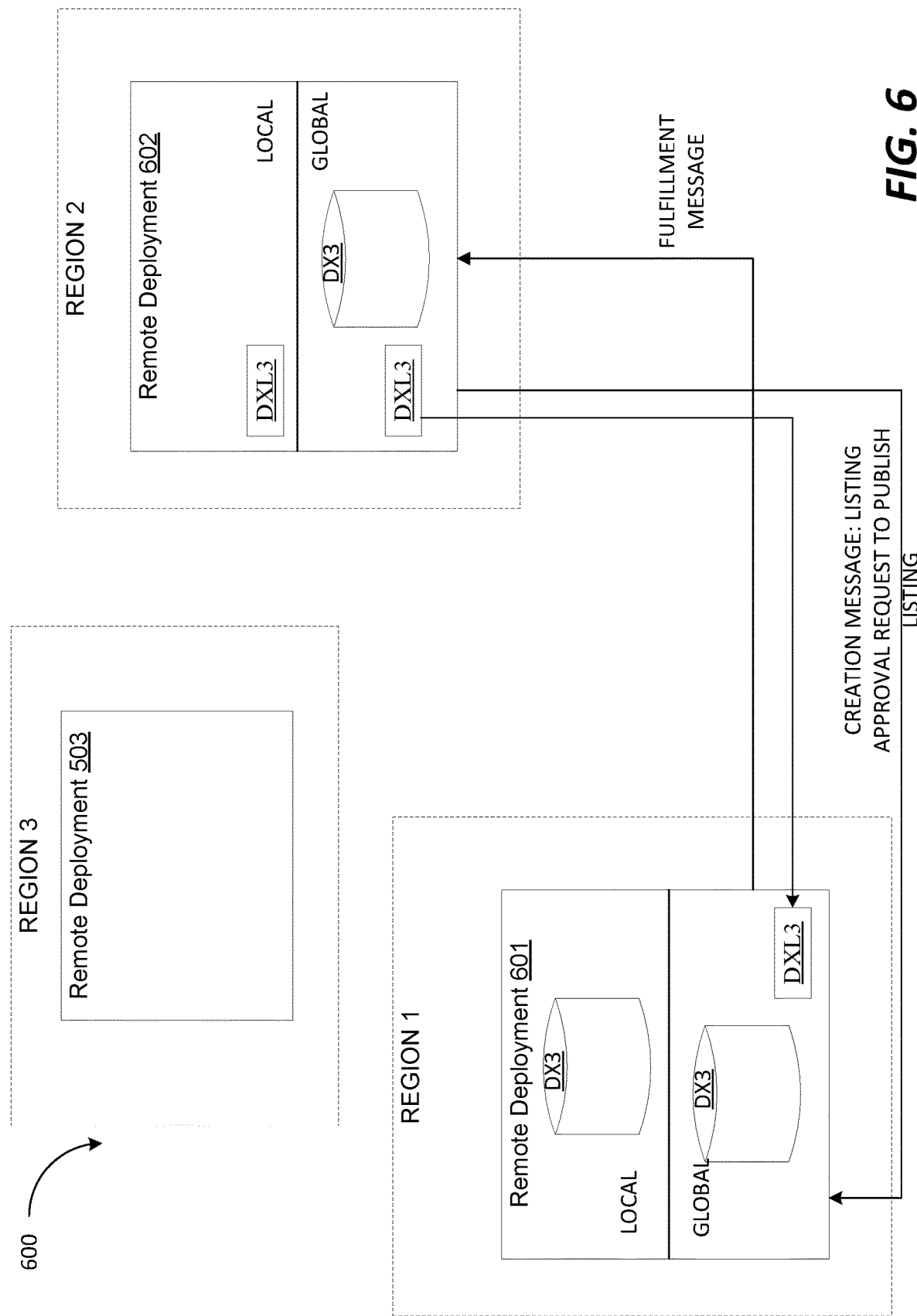
FIG. 6 is a block diagram of remote deployments in a data exchange, in accordance with some embodiments of the present invention.

Note that some listings 202 may be discoverable by users without further authentication or access permissions whereas actual accesses are only permitted after a subsequent authentication step (see discussion of FIGS. 4 and 6). The access controls 206 may specify that a listing 202 is only discoverable by specific users or classes of users.

Note also that a default function for listings 202 is that the data referenced by the share is not exportable by the consumer. Alternatively, the access controls 206 may specify that this is not permitted. For example, access controls 206 may specify that secure operations (secure joins and secure functions as discussed below) may be performed with respect to the shared data such that viewing and exporting of the shared data is not permitted.

In some embodiments, once a user is authenticated with respect to a listing 202, a reference to that user (e.g., user identifier of the user's account with the virtual warehouse 131) is added to the access controls 206 such that the user will subsequently be able to access the data referenced by the listing 202 without further authentication.

The listing 202 may define one or more filters 208. For example, the filters 208 may define specific identity data 214 of users that may view references to the listing 202 when browsing the catalog 220. The filters 208 may define a class of users (users of a certain profession, users associated with a particular company or organization, users within a particular geographical area or country) that may view references to the listing 202 when browsing the catalog 220. In this manner, a private exchange may be implemented by the exchange manager 124 using the same components. In some embodiments, an excluded user that is excluded from accessing a listing 202, i.e. adding the listing 202 to the consumed shares 116 of the excluded user, may still be permitted to view a representation of the listing when browsing the catalog 220 and may further be permitted to request access to the listing 202 as discussed below. Requests to access a listing by such excluded users and other users may be listed in an interface presented to the provider of the listing 202. The provider of the listing 202 may then view demand for access to the listing and choose to expand the filters 208 to permit access to excluded users or classes of excluded users (e.g., users in excluded geographic regions or countries).

Filters 208 may further define what data may be viewed by a user. In particular, filters 208 may indicate that a user that selects a listing 202 to add to the consumed shares 116 of the user is permitted to access the data referenced by the listing but only a filtered version that only includes data associated with the identity data 214 of that user, associated with that user's organization, or specific to some other classification of the user. In some embodiments, a private exchange is by invitation: users invited by a provider to view listings 202 of a private exchange are enabled to do by the exchange manager 124 upon communicating acceptance of an invitation received from the provider.

In some embodiments, a listing 202 may be addressed to a single user. Accordingly, a reference to the listing 202 may be added to a set of "pending shares" that is viewable by the user. The listing 202 may then be added to a group of shares of the user upon the user communicating approval to the exchange manager 124.

The listing 202 may further include usage data 210. For example, the cloud computing service 112 may implement a credit system in which credits are purchased by a user and are consumed each time a user runs a query, stores data, or uses other services implemented by the cloud computing service 112. Accordingly, usage data 210 may record an amount of credits consumed by accessing the shared data. Usage data 210 may include other data such as a number of queries, a number of aggregations of each type of a plurality of types performed against the shared data, or other usage statistics. In some embodiments, usage data for a listing 202 or multiple listings 202 of a user is provided to the user in the form of a shared database, i.e. a reference to a database including the usage data is added by the exchange manager 124 to the consumed shares of the user.

The exchange data 200 may further include user records 212. The user record 212 may include data identifying the user associated with the user record 212, e.g. an identifier (e.g., warehouse identifier) of a user having user data 133 in service database 128 and managed by the virtual warehouse 131.

The user record 212 may list shares associated with the user, e.g., reference listings 114 created by the user. The user record 212 may list shares consumed by the user, e.g. reference listings 202 created by another user and that have been associated to the account of the user according to the methods described herein. For example, a listing 202 may have an identifier that will be used to reference it in the shares or consumed shares of a user record 212.

The exchange data 200 may further include a catalog 220. The catalog 220 may include a listing of all available listings 202 and may include an index of data from the metadata 204 to facilitate browsing and searching according to the methods described herein. In some embodiments, listings 202 are stored in the catalog in the form of JavaScript Object Notation (JSON) objects.

Note that where there are multiple instances of the virtual warehouse 131 on different cloud computing platforms, the catalog 220 of one instance of the virtual warehouse 131 may store listings or references to listings from other instances on one or more other cloud computing platforms 110. Accordingly, each listing 202 may be globally unique (e.g., be assigned a globally unique identifier across all of the instances of the virtual warehouse 131). For example, the instances of the virtual warehouses 131 may synchronize their copies of the catalog 220 such that each copy indicates the listings 202 available from all instances of the virtual warehouse 131. In some instances, a provider of a listing 202 may specify that it is to be available on only on specified on or more computing platforms 110.

In some embodiments, the catalog 220 is made available on the Internet such that it is searchable by a search engine such as BING or GOOGLE. The catalog may be subject to a search engine optimization (SEO) algorithm to promote its visibility. Potential consumers may therefore browse the catalog 220 from any web browser. The exchange manager 124 may expose uniform resource locators (URLs) linked to each listing 202. This URL may be searchable and can be shared outside of any interface implemented by the exchange manager 124. For example, the provider of a listing 202 may publish the URLs for its listings 202 in order to promote usage of its listing 202 and its brand.

As explained earlier, the description of the shared data (e.g., metadata 204) provided by a data provider may not include enough detail for data consumers to understand the details of the shared data offered by the listing 202 as the data provider must manually enter the description for each listing. Further, the description may become outdated and/or fail to properly describe the shared data provided by the listing 202 as the shared data provided by the listing 202 evolves over time. To alleviate these issues, a data dictionary defining a listing and its objects is automatically generated and presented along with a description of the listing. The data dictionary for each listing may be stored in a corresponding manifest file (not shown) that is included in the catalog 220.

Figure 3:
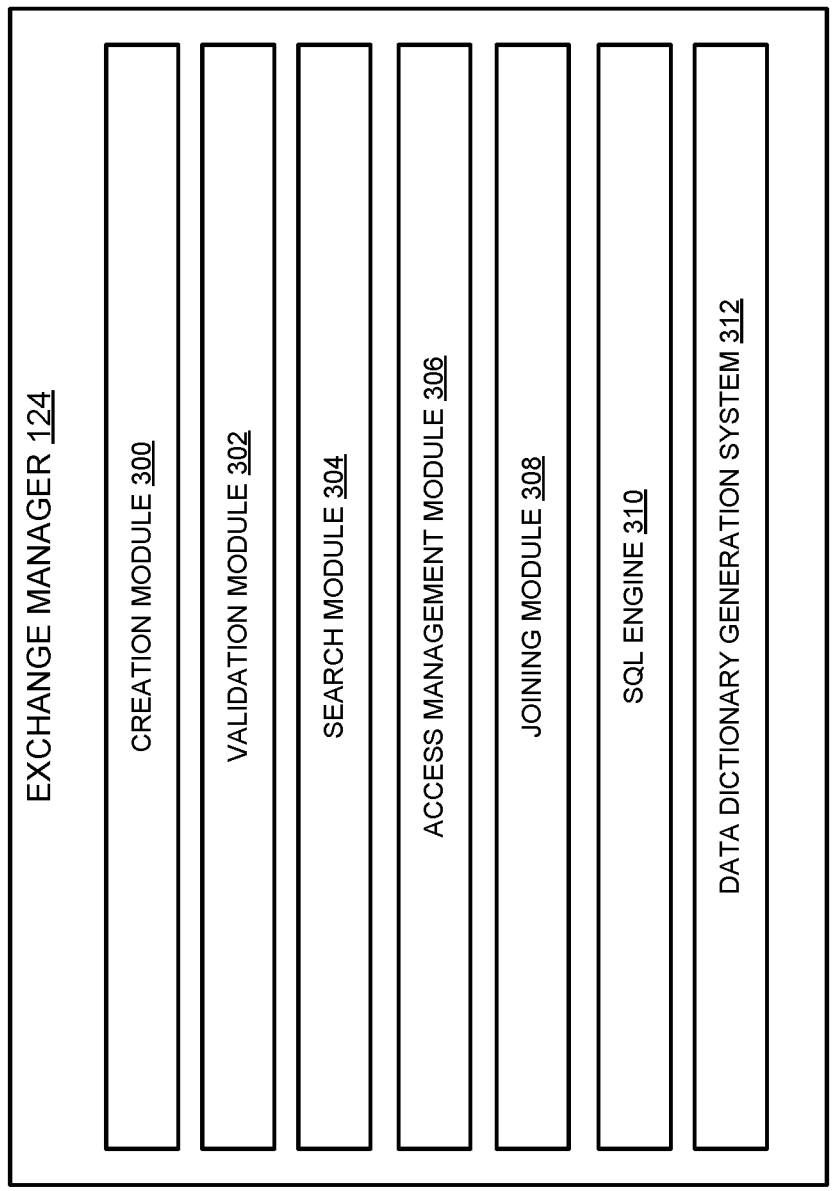
FIG. 3 is a schematic block diagram of components for implementing a data exchange, in accordance with some embodiments of the present disclosure.

FIG. 3 illustrates various components 300-314 that may be included in the exchange manager 124. A creation module 300 may provide an interface for creating listings 202. For example, a webpage interface to the virtual warehouse 131 that enables a user on a device 101-104 to select data, e.g. a specific table in user data 150 of the user, for sharing and enter values defining some or all of the metadata 204, access controls 206, and filters 208. In some embodiments, creation may be performed by a user by way of SQL commands in an SQL interpreter executing on the cloud computing platform 110 and accessed by way of a webpage interface on a user device 101-104.

A validation module 302 may validate information provided by a provider when attempting to create a listing 202. Note that in some embodiments the actions ascribed to the validation module 302 may be performed by a human reviewing the information provided by the provider. In other embodiments, these actions are performed automatically. The validation module 302 may perform, or facilitate performing by a human operator of various functions. These functions may include verifying that the metadata 204 is consistent with the shared data to which it references, verifying that the shared data referenced by metadata 204 is not pirated data, personal identification information (PII), personal health information (PHI) or other data from which sharing is undesirable or illegal. The validation module 302 may also facilitate the verification that the data has been updated within a threshold period of time (e.g., within the last twenty-four hours). The validation module 302 may also facilitate verifying that the data is not static or not available from other static public sources. The validation module 302 may also facilitate verifying that the data is more than merely a sample (e.g., that the data is sufficiently complete to be useful). For example, geographically limited data may be undesirable whereas an aggregation of data that is not otherwise limited may still be of use.

The exchange manager 124 may include a search module 304. The search module 304 may implement a webpage interface that is accessible through use of user devices 101-104 in order to invoke searches for search strings with respect to the metadata in the catalog 220, receive responses to searches, and select references to listings 202 in search results for adding to the consumed shares 116 of the user record 212 of the user performing the search. In some embodiments, searches may be performed by a user by way of SQL commands in an SQL interpreter executing on the cloud computing platform 110 and accessed by way of a webpage interface on user devices 101-104. For example, searching for shares may be performed by way of SQL queries against the catalog 220 within the SQL engine 310 discussed below.

The search module 304 may further implement a recommendation algorithm. For example, the recommendation algorithm could recommend other listing 202 for a user based on other listings in the user's consumed shares 116 or formerly in the user's consumed shares. Recommendations could be based on logical similarity: one source of weather data leads to a recommendation for a second source of weather data. Recommendations could be based on dissimilarity: one listing is for data in one domain (geographic area, technical field, etc.) results in a listing for a different domain to facilitate complete coverage by the user's analysis (different geographic area, related technical field, etc.).

The exchange manager 124 may include an access management module 306. As described above, a user may add a listing 202 that may require authentication with respect to the provider of the listing 202. Once a listing 202 is added to the consumed shares 116 of the user record 212 of a user, the user may be either (a) required to authenticate each time the data referenced by the listing 202 is accessed or (b) be automatically authenticated and allowed to access the data once the listing 202 is added. The access management module 306 may manage automatic authentication for subsequent access of data in the consumed shares 116 of a user in order to provide seamless access of the shared data as if it was part of the user data 133 of that user. To that end, the access management module 306 may access controls 206 of the listing 202, certificates, tokens, or other authentication material in order to authenticate the user when performing accesses to shared data.

The exchange manager 124 may include a joining module 308. The joining module 308 manages the integration of shared data referenced by consumed shares 116 of a user with one another, i.e. shared data from different providers, and with a user database 152 of data owned by the user. In particular, the joining module 308 may manage the execution of queries and other computation functions with respect to these various sources of data such that their access is transparent to the user. The joining module 308 may further manage the access of data to enforce restrictions on shared data, e.g. such that analysis may be performed and the results of the analysis displayed without exposing the underlying data to the consumer of the data where this restriction is indicated by the access controls 206 of a listing 202.

The exchange manager 124 may further include a standard query language (SQL) engine 310 that is programmed to receive queries from a user and execute the query with respect to data referenced by the query, which may include consumed shares 116 of the user and the user data 133 owned by the user. The SQL engine 310 may perform any query processing functionality known in the art. The SQL engine 310 may additionally or alternatively include any other database management tool or data analysis tool known in the art. The SQL engine 310 may define a webpage interface executing on the cloud computing platform 102 through which SQL queries are input and responses to SQL queries are presented.

The exchange manager 124 may also include a data dictionary generation system 312 that is programmed to automatically populate and update a data dictionary for each listing 202. A data dictionary includes metadata describing the shared data included in the listing 202 overall as well as metadata describing the individual objects included in the listing 202, such as the individual tables, schemas, views, functions, and the like. The shared data and each individual data object provided by the listing 202 may be described in the data dictionary by a set of data fields that corresponds to the shared dataset or the object type of the individual object. For example, the set of data fields used to describe the listing 202 may include a high-level summary of the shared data included in the listing 202, such as the number of schemas, tables, views, functions, and/or stored procedures included in the shared data. The set of data fields used to describe an individual object may provide more specific data about the object and its contents. For example, the set of data fields used to describe a table may include information describing the table (e.g., table name, description, size, number of rows, number of columns), information describing each column in the table (e.g., name, description, data type, example value), column statistics (e.g., ranges of values, frequencies), and table previews. As another example, the set of data fields used to describe a function or stored procedure may include a name of the function or stored procedure, description, parameter names and parameter types.

The metadata populated to the data dictionary can be presented to data consumers along with the description of the listing 202 when requested by data consumers. For example, the metadata populated to the data dictionary can be presented in a user interface along with the description when a data consumer selects to view a listing 202 available through a data exchange. The data provided in the data dictionary provides data consumers a comprehensive description of the shared data provided by a listing 202, including a high-level summary of the shared data and description of each individual object included in the shared data. The information included in the data dictionary allows data consumers to understand the contents of the shared data offered by the listing 202 and how to use the shared data included in the listing 202.

To generate the data dictionary for a listing 202, the data dictionary generation system 312 analyzes the shared data provided by the listing 202 to identify objects included in the shared data. The data dictionary generation system 312 identifies a set of data fields associated with each identified object and populates the set of data fields associated with each identified object based on the shared data offered by the listing 202. For example, the data dictionary generation system 312 may access the title of a table to populate a table name data field, count the number of columns included in a table to populate the number of columns data field, and the like. The data dictionary generated by the data dictionary generation system 312 can be populated to a manifest file associated with the listing 202. For example, the manifest file may be stored in the catalog 220, from which the stored data dictionary can be subsequently accessed and used to generate the description for the listing 202.

To ensure that a data dictionary for each listing 202 is generated and remains up to date as the shared data provided by the listing is updated, the data dictionary generation system 312 periodically scans the listings 202 to identify any changes to share access granted to the listings 202. For example, the data dictionary generation system 312 determines whether a listing 202 has been granted access to a new object, has had access to an object revoked, or whether access to an object has been modified. If a change to the share access granted to a listing 202 is detected, the data dictionary generation system 312 generates an updated data dictionary for the listing 202. The updated data dictionary is then populated to the manifest file associated with the listing 202 to provide an updated description of the listing 202.

The functionality of the data dictionary generation system 312 is described in greater detail below in relation to FIGS. 10-16.

The exchange manager 124 may further include a data listing distribution component 314 that manages distributing a listing 202 to various remote deployments in a data exchange. For example, the data listing distribution component 314 may replicate a data dictionary generated for the listing 202 and shared data offered by the listing 202 from a source deployment to one or more destination deployments. Each remote deployment may be associated with a geographic region. The data listing distribution component 314 distributes the listing 202 to the various remote deployments to allow for the listing 202 to be accessed by users within the region associated with the geographic region. The data listing replication component 314 may utilize the global messaging framework and replication method described in relation to FIGS. 4A and 4B below. The functionality of the data listing distribution component 314 is described in further detail below in relation to FIGS. 21-23.

Figure 4A:
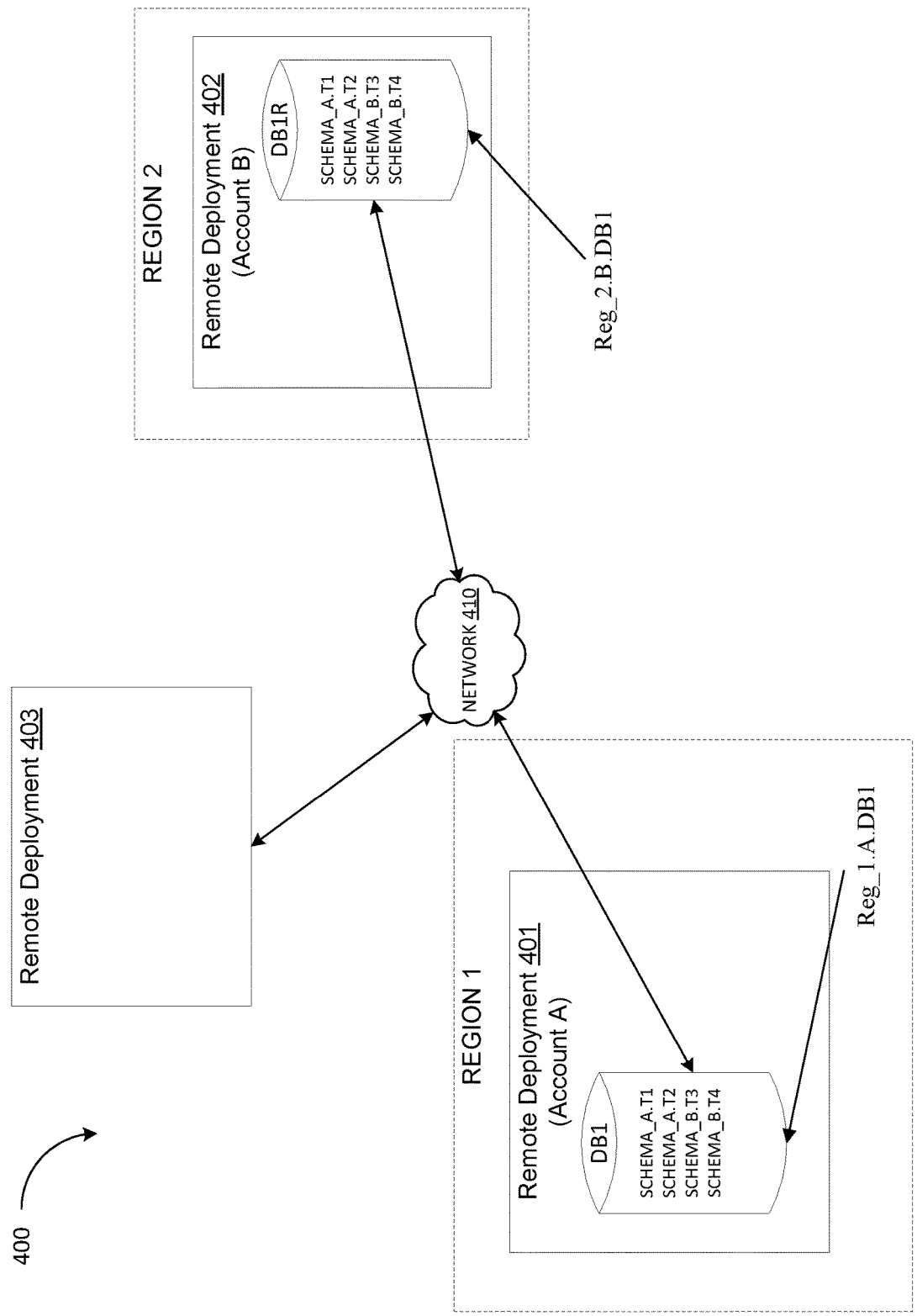
FIG. 4A is a block diagram of remote deployments in a data exchange, in accordance with some embodiments of the present invention.

FIG. 4A illustrates a cloud environment 400 comprising multiple remote cloud deployments 401, 402, and 403 communicating via a network 410. Each of the remote deployments 401, 402, and 403 may comprise a similar architecture to cloud computing service 112 (illustrated in FIG. 1A). The remote deployments 401, 402, and 403 may all be physically located in separate remote geographical regions but may all be deployments of a single data exchange or single data marketplace. In cloud environment 400, requests for data such as data listings, databases, or shares on remote deployment 401 may originate from an account on remote deployment 402 or remote deployment 403. The remote deployment 401 may be the origin deployment of the data exchange or data marketplace and may utilize an appropriate data replication method to make the data of such a request available on remote deployments 402 and 403.

Figure 4B:
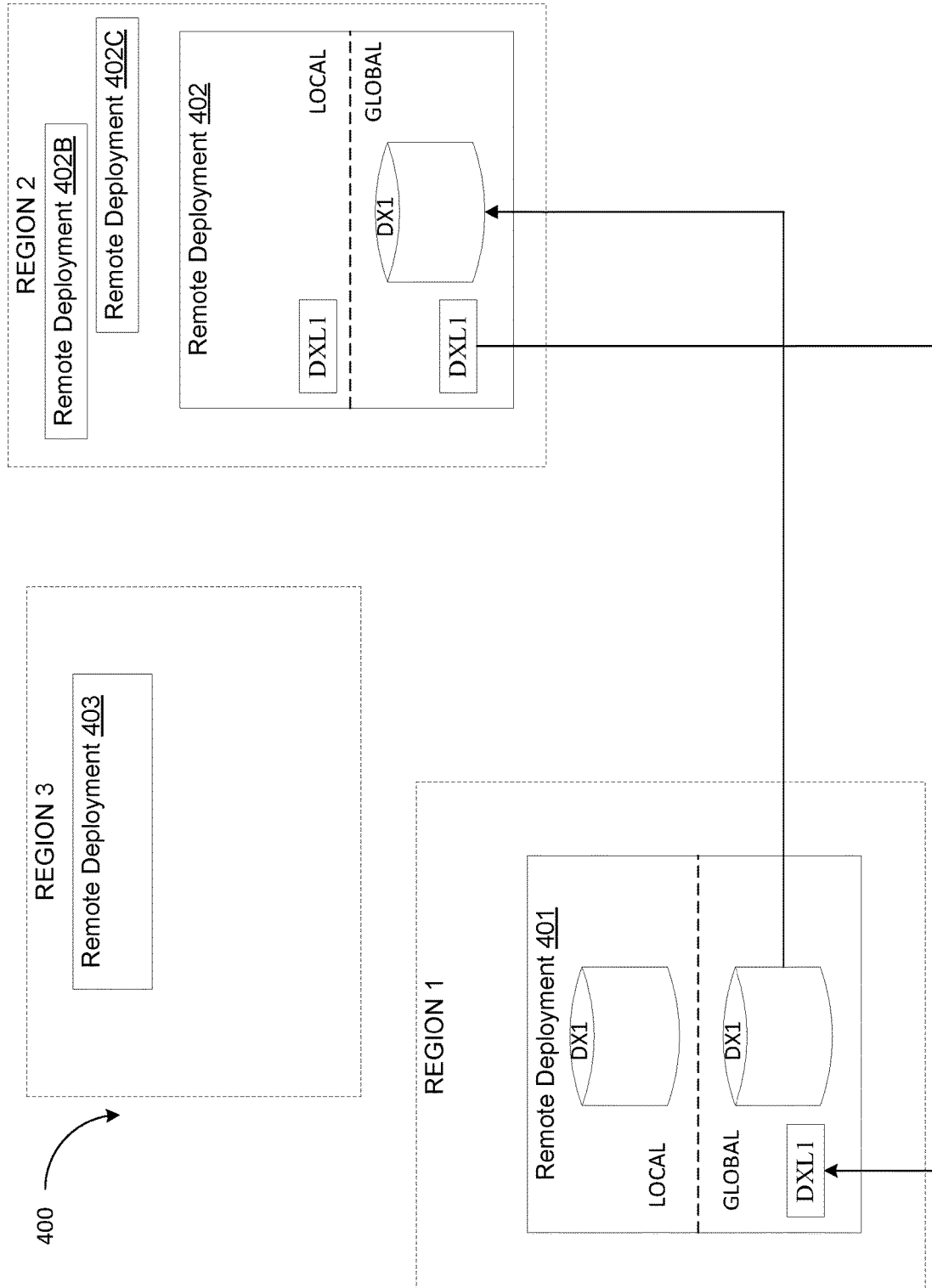
FIG. 4B is a block diagram of remote deployments in a data exchange, in accordance with some embodiments of the present invention.

For example, if account A resides on remote deployment 401 located in region 1 and has a database DB1 on remote deployment 401 that account A wants to share with account B residing within remote deployment 402 located in region 2, account A may alter the database DB1 such that it becomes a global type database (as opposed to region specific) and replicate the metadata of DB1 to the remote deployment 402 (e.g., by using an SQL command "alter database DB1 enable replication to accounts Reg_2.B"). Account B may obtain a list of databases for which they have access to (e.g., using an SQL command "show replication databases") which will return the identifier "Reg_1.A.DB1 (primary)" indicating DB1. Account B may create a local replica of DB1 (shown in FIG. 4A as DB1R) on remote deployment 402 (e.g., by using the SQL command "create database DB1R as replica of Reg_1.A.DB1"), which creates a global type database, because it was created as a replica. It should be noted that as of now, no data replication has started yet. At this point, the command "show replication databases" will return the identifiers "Reg_1.A.DB1 (primary)" and "Reg_2.B.DB1 (secondary)." Account B may initiate the data replication by using a command (e.g., "alter database DB1 refresh") which is a synchronous operation whose duration may depend on the amount of data to synchronize. As shown in FIG. 4B, each remote deployment includes certain objects locally and those that it accesses a global version of Although discussed in terms of a database, the above method may be used to replicate various types of data objects between remote deployments including data exchanges, data listings, and shares, for example.

In some embodiments, the remote deployments 401-403 may leverage a global messaging framework that utilizes special message types (as discussed in further detail herein) that each specifically enable various different functions. For each global message type, there is a corresponding processing function that applies to processing messages of that type. Thus, a global message of a particular type will include custom logic for what processing needs to be done for that particular message type as discussed in further detail herein.

Although cross-region functionality as discussed above can be implemented, in some scenarios a data exchange owner/admin may want to restrict where (e.g., which regions or remote deployments) the data exchange is available. In addition, a data provider may wish to control where their data listings are visible. For example, companies and governments may have disparate and varying requirements/regulations on where certain data can be available. Data providers themselves may have their own requirements/restrictions as to who can see/access their data and where their data can be seen/accessed from, and may also wish to restrict where their listings are visible. Although controls regarding listing visibility may be implemented in a single instance of a data exchange, implementing such controls in a cross-region data exchange, over remote deployments that do not share the same storage is not feasible. In addition, even if a listing is visible across multiple deployments 402 and 403, because the data still resides in the local deployment 401, a means for requesting and fulfilling the data is required.

Embodiments of the present disclosure may utilize the data replication process and global messaging framework described herein to replicate data between remote deployments 401-403 based on customized logic in order to make a data exchange available in specific regions, which could be cross-cloud, and also replicate information regarding the visibility of each data listing in the data exchange to certain regions as well, so that such restrictions may be enforced in each remote deployment, even though the data listing wasn't initially created there. Although discussed in terms of a data exchange, the embodiments of the present disclosure may be implemented in a data marketplace as well. FIG. 4B illustrates the cloud environment 400 in accordance with some embodiments of the present disclosure.

FIG. 4B illustrates remote deployment 401, which may be the origin deployment of the data exchange DX1 along with remote deployments 402 and 403. Remote deployments 402 and 403 are remote deployments where the data exchange DX1 could be made available and, as discussed above, may each reside in their own geographic region (hereinafter "region" and shown in FIG. 4B as regions 1, 2, 3). The data exchange DX1 may have a designated data exchange administrator account (hereinafter "exchange admin") and may provide functionality to allow the exchange admin on remote deployment 401 to specify the regions in which the data exchange DX1 will be available (resolvable) and from which regions customers can be added as members of the data exchange DX1. It should be noted that the exchange admin (like other accounts) may include an account administrator role, which may delegate the ability to specify regions in which the data exchange DX1 will be available to other roles in the exchange admin. The data exchange DX1 may also include functionality to allow a data provider to restrict the regions in which visibility for their listing(s) (e.g., listing DXL1 shown in FIG. 4B) is allowed. The remote deployment 401 may provide commands (e.g., SQL commands) for the exchange admin to set the available regions. For example, an exchange admin may use the command "Create data exchange <data_exchange_name> regions=region1, . . . " to create a data exchange that is available in certain regions (e.g., region 1 etc.). When the exchange admin wishes to modify the available regions, they may use the command "Alter data exchange <data_exchange_name> set regions=region1, region2 . . . " to modify the regions in which the data exchange is available. The exchange admin may also utilize the command "Alter data exchange <data_exchange_name> unset regions" to remove all currently set available regions, for example. In some embodiments, the exchange admin may modify availability regions, while data exchange account holders, administrators and data providers can view a list of available regions (e.g., using the command "Show regions in data exchange <data_exchange_name>"). For a public data exchange, the available regions may automatically be set to those regions where the public data exchange is currently replicated.

When an exchange admin sets the available regions for the data exchange, this information may be persisted as a list in the local database (not shown) of remote deployment 401. The local database may be any appropriate database, such as e.g., FoundationDB. The local database of remote deployment 401 may include a number of data processing objects (DPOs) in which data pertaining to the data exchange DX1 may be stored. For example, a base dictionary DPO may comprise a set of database tables used to store information about the database's definition including information about database objects such as tables, indexes, columns, data types, and views.

One such DPO may be an available regions DPO which extends the base dictionary DPO and in which the available regions of the data exchange DX1 may be persisted. Stated differently, the specified available regions may be a property of the base dictionary DPO. As can be seen in the example commands listed above, the exchange admin may specify the regions in which the data exchange DX1 is available on a region by region basis, instead of specifying particular remote deployments in which DX1 is available on a deployment by deployment basis. Because of this, when the "Alter data exchange" command is executed, instead of persisting deployment identifiers (IDs) of remote deployments on which the data exchange DX1 is to be made available, the remote deployment 401 may persist the deployment location ID of each region where the data exchange is to be made available. A deployment location ID may be represented in any suitable alpha-numeric form such as 1001 or region1 (corresponding to region 1), and 1002 or region2 (corresponding to region 2). The list of available deployment location IDs may be stored as a string (defined as e.g., static final String AVAILABLE_DEPLOYMENT_LOCATION_IDS="availabledeploymentlocationIDs") within the available regions DPO, and the string may be parsed to determine the deployment location IDs of regions where the data exchange DX1 is available when a member of the data exchange DX1 wishes to know the available regions. It should be noted that any of regions 1, 2, and 3 may contain multiple remote deployments and each of these remote deployments may be referred to as a deployment shard. Each deployment shard in a particular region will share the same deployment location ID. Utilizing deployment location IDs is efficient because there is no need to manually refresh a list (string) of available deployment IDs in the available regions DPO every time a new deployment is created. For example, if a new sharding deployment(s) is added to a region, storing deployment IDs would require a manual refresh of the list of available deployment IDs in the relevant DPO. By utilizing/storing deployment location IDs, if e.g., a new deployment/shard is created in any region, the remote deployment 401 only needs to obtain the deployment region of the new deployment/shard, which is easy because it is included in the deployment metadata of the new deployment/shard.

The remote deployment 401 may then replicate the data exchange DX1 to each remote deployment in each of the regions in which the data exchange is to be available (as specified by the exchange admin) using the database replication method discussed hereinabove. For the global object corresponding to the data exchange DX1, remote deployment 401 may decide which remote deployment(s) the global object is to be replicated to by parsing the string of deployment location IDs from the available regions DPO to determine the list of regions where the data exchange DX1 is available. In the example illustrated in FIG. 4B, the exchange admin may set regions 1 (where it currently already exists) and 2 as available regions. When replicating the data exchange DX1, remote deployment 401 needs to know what remote deployments are available in region 2, and may obtain all remote deployments in region 2 (e.g., deployment location ID 1002). In the example of FIG. 4B, this may include remote deployments 402, 402B, and 402C). More specifically, the remote deployment 401 may include a mapping between the deployment location ID of region 2 and the deployment ID of each deployment shard in region 2. Thus, the data exchange DX1 can easily look up all the deployment shard IDs in region 2 (identified by its deployment location ID) and replicate the info to all of the relevant deployment shards. As shown in FIG. 4B, the global object corresponding to the data exchange DX1 is then replicated to remote deployment 402. When a new deployment is created, the list of remote deployments to replicate to may be backfilled by refreshing it. The remote deployment 401 may then continue the data replication method described hereinabove to replicate the data exchange DX1 to each remote deployment in region 2 (i.e. remote deployment 402). The remote deployment 401 may perform this process of obtaining the list of available regions and replicating the data exchange DX1 to the remote deployments in those regions at regular intervals, in some embodiments. As can be seen in FIG. 4B, remote deployment 402 may now access a global copy of data exchange DX1.

Upon the available regions for the data exchange DX1 being set, a data provider of the data exchange DX1 may set the regions in which their listings will be visible (e.g., set listing visibility). A listing may be a consumer viewable representation of data that the data provider wishes to share. The listing may describe what the underlying data is about, contain usage examples regarding the data, and other metadata as discussed herein. The data provider creates the listing, and upon creation, only the data provider can see the listing. Data providers may send listings to the exchange admin for publishing approval (referred to as "listing approval" as described in further detail herein). Once approved, data providers can publish listings to be available globally, in regions where the data exchange DX1 is available.

Listing visibility does not refer to a physical restriction enforced by the existence (or lack thereof) of a listing in remote deployments, which means the listing may be still replicated to those deployments while remaining invisible to consumers there. Once the exchange admin decides which regions the data exchange DX1 is available in, a data provider can choose a subset of those regions in which to make a listing visible.

In the example illustrated in FIG. 4B, a data provider in remote deployment 402 may generate a listing DXL1 (locally in remote deployment 402) to share particular data. The local copy of data exchange DX1 (e.g., previously replicated from remote deployment 401) may provide a set of commands (e.g., SQL commands) for the data provider to set the regions in which listing DXL1 will be visible. For example, the data provider may use the command "Alter listing <listing_name> set regions=region1, region2 . . . " to set the regions in which DXL1 will be visible. The data provider may use the command "Alter listing <listing_name> unset regions" to remove all of the previously set regions (so that the listing is not visible in any regions), and may use the command "Show listings in data exchange <dx_name>;" to see the current regions in which DXL1 is visible.

When the data provider sets the regions in which the listing DXL1 is to be visible, this information may be persisted as a list in the local database of the remote deployment 402 (not shown). The local database of remote deployment 402 may be any suitable database such as e.g., FoundationDB and may include a listing visibility regions DPO (not shown) which extends the base dictionary DPO and in which the regions where one or more listings are visible may be persisted. As can be seen in the example commands listed above, the data provider may specify the regions in which their listings are visible on a region by region basis, instead of specifying particular deployments on which their listings are visible on a deployment by deployment basis. Because of this, when the "Alter listing <listing_name> set regions" command is executed, instead of persisting deployment IDs of remote deployments on which the listings are to be made visible, the remote deployment 402 may persist the deployment location ID of each region where the listing DXL1 is to be made visible. The list of deployment location IDs where the listing DXL1 is to be made visible may be stored as a string (defined as e.g., static final String VISIBLE_DEPLOYMENT_LOCATION_IDS= "availabledeploymentlocationIDs") in the listing visibility regions DPO, and the string may be parsed to determine the deployment location IDs of regions in which the listing DXL1 is visible when the data provider or the exchange admin wishes to know the regions in which the listing DXL1 is to be visible.

Utilizing deployment location IDs is efficient because there is no need to manually refresh a list of deployment IDs for deployments on which the listings are visible in the listing visibility regions DPO every time a new deployment is created. For example, if a new sharding deployment(s) is added to a region, storing deployment IDs will require a manual refresh of the list of deployment IDs on which the listings are visible. By utilizing/storing deployment location IDs, if a new deployment/shard is created, the data exchange only needs to get the deployment location (region) of the new deployment/shard, which is easy because it is in the deployment metadata of the new deployment/shard.

When the visible regions for the listing DXL1 are set, the remote deployment 402 may replicate the listing DXL1 and the visibility list to each remote deployment in each region where the listing DXL1 is made visible. As discussed above, the remote deployment 402 may obtain the list of regions where the listing DXL1 is visible by parsing the string of deployment location IDs from the listing visibility regions DPO and may package the list of regions along with other information regarding the listing DXL1 such as a type of the listing DXL1 as well as metadata of the listing DXL1 into a single listing information package. The remote deployment 402 may utilize the data replication method described herein, and when the global object corresponding to the listing DXL1 is created, it may include the listing information package. In some embodiments, if the exchange admin is located on a different remote deployment than the data provider (as in the example of FIG. 4B), the exchange admin may obtain the list of regions where the listing DXL1 is visible from the global object corresponding to the listing DXL1 (which includes a copy of the listing information package). Remote deployment 402 may decide which remote deployment(s) the global object is to be replicated based on the list of regions where the listing DXL1 is visible. Remote deployment 402 may then complete the data replication to replicate the listing DXL1 and the listing information package to each remote deployment in each region where the listing DXL1 is to be visible. The remote deployment 402 may perform this process of obtaining the list of regions where the listing DXL1 is visible and replicating the listing DXL1 and the listing information package to remote deployments in those regions at regular intervals. In the example of FIG. 4B, the data provider has set regions 1 and 2 as regions where the listing DXL1 is visible, and thus DXL1 is replicated to remote deployment 401 as shown.

In some embodiments, the listing DXL1 and the corresponding visibility list may be replicated to each region in which the data exchange DX1 is available, and the listing visibility restrictions may be enforced logically on remote deployments in regions where the listings are not meant to be visible, as specified by the data provider. For example, if the deployment location ID of region 3 is not included in the visibility list, the listing DXL1 and the visibility list may still be replicated to remote deployment 403 (if the data exchange is made available there), but when a consumer on remote deployment 403 wants to resolve the listings available to them, the visibility restrictions set by the data provider may be logically enforced by remote deployment 403 and the consumer on remote deployment 403 may not see the listing DXL1.

When a consumer in a remote deployment 401 in region 1, for example, where the listings are visible (as specified by the data provider) tries to resolve the listings available to them, they may see the listing DXL1 of the data provider and may request to access the data of the listing DXL1. If the listing is pre-approved and the data has already been attached to the listing DXL1, then the data of the listing DXL1 will be replicated immediately/directly along with the listing DXL1 and the listing information package. If the data has not yet been attached to the listing DXL1, the listing DXL1 and the listing information package will still be replicated to remote deployment 401 but the consumer in region 1 will need to request the data.

If a data provider subsequently updates the list of visible regions of listing DXL1 so that the listing is no longer visible in a region in which on which it was previously visible, then consumers on the remote deployments of that region who were members of the data exchange DX1 at the time of listing replication may still be able to resolve the listing, however consumers on the remote deployments of that region who are new members of the data exchange DX1 may not be able to resolve the listing.

Upon replication of the listing DXL1 to each appropriate remote deployment, the data exchange DX1 and listing DXL1 are made global, allowing for requests from consumers in any appropriate remote deployments to make a request to consume the underlying data of the listing DXL1. However, although the listing DXL1 is visible across multiple remote deployments, the underlying data still resides in local remote deployment 401. In order to request the underlying data and fulfill the request, the existing global messaging framework is leveraged to manage consumer requests for listings and to allow data providers to manage listing approval requests.

Figure 5:
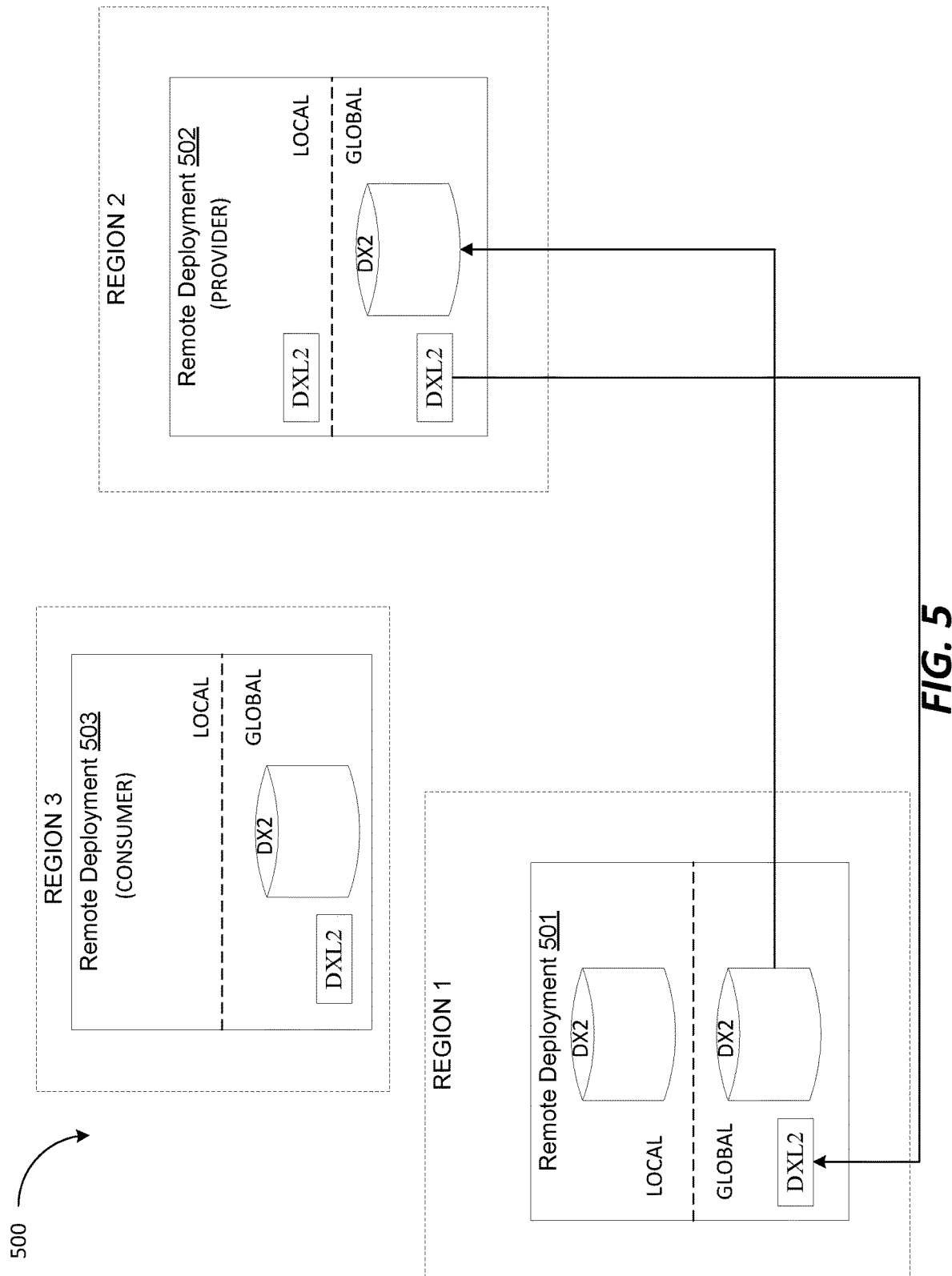
FIG. 5 is a block diagram of remote deployments in a data exchange, in accordance with some embodiments of the present invention.

FIG. 5 illustrates a diagram of a cloud environment 500, which may be similar to the cloud environment 400 illustrated in FIGS. 4A and 4B. In the example of FIG. 5, a consumer on remote deployment 503 where a listing DXL2 is visible wants to request data of the listing DXL2 from the data provider who owns the listing DXL2 on remote deployment 502, which may communicate with the exchange admin on remote deployment 501.

When the consumer in remote deployment 503 wishes to request the listing DXL2, they may utilize the listing metadata (included within the listing information package that is replicated with the global object corresponding to listing DXL2) that indicates who the data provider is and where they are from/their origin remote deployment to determine where to send a request to. The remote deployment 503 may utilize a global message having a global message type "DATA_EXCHANGE_LISTING_REQUEST_SYNC." As discussed above, for each global message type, there is a corresponding processing function that applies to processing messages of that type. Thus, a global message of a particular type will include custom logic for what processing needs to be done for that particular message type. A DATA_EXCHANGE_LISTING_REQUEST_SYNC type of message may be used for managing consumers' requests to providers for listings. This includes creating, cancelling, rejecting, and fulfilling these requests, as well as cleaning requests up (expiring them) when members are removed from the data exchange or a listing is deleted. These messages are sent between the data provider and consumer. The remote deployment 503 may send a creation message (of type: DATA_EXCHANGE_LISTING_REQUEST_SYNC) to the remote deployment 502, which may include a local database having an access request DPO (not shown) that may be used by the data provider to manage approval/denial of requests for data listings. As discussed herein with respect to the global message framework, the creation message may include specialized logic to update the appropriate slice of the access request DPO with the information of the request. Examples of information of the request may include requestor contact information, requestor account and region it locates in, as well as why/reason they might be interested in. As used herein, a slice of a multi-dimensional array such as a DPO is a column of data corresponding to a single value for one or more members of a particular dimension.

The data provider in remote deployment 502 may fulfill the request for the listing DXL2 by creating a share associated with the listing and granting access to the share associated with the listing to the consumer. A "ListingRequestFulfiller" background service (BG) may sync listing request fulfillment information and notify/replicate this information to the other regions/deployment shards that might be of interest. More specifically, the "ListingRequestFulfiller" BG may call a fulfillment (global) message (of type: DATA_EXCHANGE_LISTING_REQUEST_SYNC) that will mark the request as fulfilled for the listing provider in the access request DPO, remove it from a "provider_pending" slice of the access request DPO, and write it to the "provider history" slice of the access request DPO after setting its status to FULFILLED. It should be noted that the share associated with that listing DXL2 can be created (and access to it granted) either by the data provider or a fulfiller which is a data provider in the same remote deployment shard as the consumer (e.g., remote deployment 503) or a data provider located in the same region as the consumer (e.g., region 3). If the access is granted by a fulfiller in the same deployment shard as the consumer, this may trigger a write to a "listingShareUpdatedOn" slice in a share status DPO on the remote deployment 503, used by the consumer to manage their listing data requests. The "listingShareUpdatedOn" slice may be used to indicate data listings that the consumer has been granted access to a share of. If the access is granted by a fulfiller that is not in the same deployment shard as the consumer but is on a deployment shard in the same region, a "RemoteShardAccountManager" BG that syncs account and share info between deployment shards in the same region may run in the consumer's remote deployment 503, see the consumer was added to the share, and update the "listingShareUpdatedOn" slice of the share status DPO. The "ListingRequestFulfiller" BG will run in the consumer's remote deployment 503 and mark the request as fulfilled locally in the share status DPO and will send a fulfillment message (of type: DATA_EXCHANGE_LISTING_REQUEST_SYNC) to the provider on remote deployment 502 to update the access request DPO by marking the request as fulfilled, removing it from the "provider_pending" slice and writing it to the "provider history" slice after setting its status to FULFILLED.

If the provider denies the request, then it may update the access request DPO and send a rejection message (of type: DATA_EXCHANGE_LISTING_REQUEST_SYNC) to the remote deployment 503 with logic to update the appropriate slices of the share status DPO.

In some embodiments, no request from a consumer is necessary, and the data provider may create a share (not shown) and attach it to the data listing DXL2. The data provider may add a consumer to the share and the consumer may consume the data from the share. Note that in embodiments where no request is made by the consumer, the share can be created either by the data provider or a fulfiller (which is a data provider in the same remote deployment as the consumer).

FIG. 6 illustrates a cloud environment 600, which may be similar to the cloud environment 400 illustrated in FIGS. 4A and 4B. In the example of FIG. 6, a data provider on remote deployment 602 may wish to send a request for approval to publish their listing DXL3 to the exchange admin on remote deployment 601. The data provider and the exchange admin may use a special global message type (e.g., Global message type: DATA_EXCHANGE_LISTING_APPROVAL_REQUEST_SYNC) that is used for managing requests by a data provider for approval to publish their listings including creation, cancellation, rejection, and approval of publishing requests. A publishing request DPO on the local database of remote deployment 601 may be used by the exchange admin to manage approval/denial of listing publication requests. The publishing request DPO may include a plurality of slices, where each slice is a column of data corresponding to a single value for each of one or more members of a particular dimension of the DPO. The publishing request DPO may include an "exchange admin" slice for the exchange admin, a "data provider" slice for the data provider, and an "updatedOn" slice for tracking when a request was last updated. Each of the slices may include one or more data categories such as a local entity ID of the data exchange of the requested listing, a deployment that the data exchange of the requested listing is on, a deployment that the requested listing is on, a local entity ID of the requested listing, an account ID of the listing owner (provider), a status of the request (e.g. pending, rejected, approved, etc.), a JSON string containing information for user interface (UI) display, a reason for why the request was rejected (if it was rejected), a timestamp of when the request was issued, and a timestamp of when the request was last updated. The local database of remote deployment 602 may include a separate listing approval request DPO that is identical to the publishing request DPO and is used by the data provider to manage listing publication requests. The listing approval request DPO and the publishing request DPO may share similar information because multiple accounts cannot modify the same object/DPO, and thus two separate but similar DPOs (each owned by an individual actor—e.g., the exchange admin and the provider) are utilized.

The data provider may generate an approval request indicating a listing DXL3 that he/she wishes to publish on the remote deployment 601 of the exchange admin and update the (relevant data categories of) "provider" slice of the listing approval request DPO with the information of the request. Subsequently, the data provider (e.g., via remote deployment 602) may send a creation message to the exchange admin on remote deployment 601 to request publication of data listing DXL3 on the remote deployment 601. The creation message may write the approval request to the "exchange admin" slice and the "updatedOn" slice of the publishing request DPO on the remote deployment 601. More specifically, the creation message may update each of the relevant data categories listed above for each of the "exchange admin" and "updatedOn" slices of the publishing request DPO with the relevant information of the approval request. The creation message may also remove any rejected or approved approval requests for the same listing from the admin slice.

If the exchange admin decides to reject the approval request, it may update the "status of the request" and "reason for rejection" fields in the "exchange admin" and "updatedOn" slices of the publishing request DPO and use a rejection message to update the "data provider" slice of the listing approval request DPO on the remote deployment 602. As part of updating the data provider slice, the rejection message may update the "status of the request" and "reason for rejection" fields in the "data provider" slice of the listing approval request DPO accordingly.

If the exchange admin decides to grant the approval request, it may update the "status of the request" and "reason for rejection" fields in the "exchange admin" and "updatedOn" slices of the publishing request DPO and use a fulfillment message to update the data provider slice of the listing approval request DPO on the remote deployment 602. As part of updating the data provider slice, the fulfillment message may update the "status of the request" and "reason for rejection" fields in the "data provider" slice of the listing approval request DPO accordingly.

The data provider may also utilize a cancellation message, which may remove any approval requests (with status PENDING or APPROVED or REJECTED) from the exchange admin slice of the publishing request DPO on remote deployment 401. When the data provider publishes an approved listing, the cleanup "cancels" the request on their behalf using this same code path to remove the request on the exchange admin's side.

Figure 7:
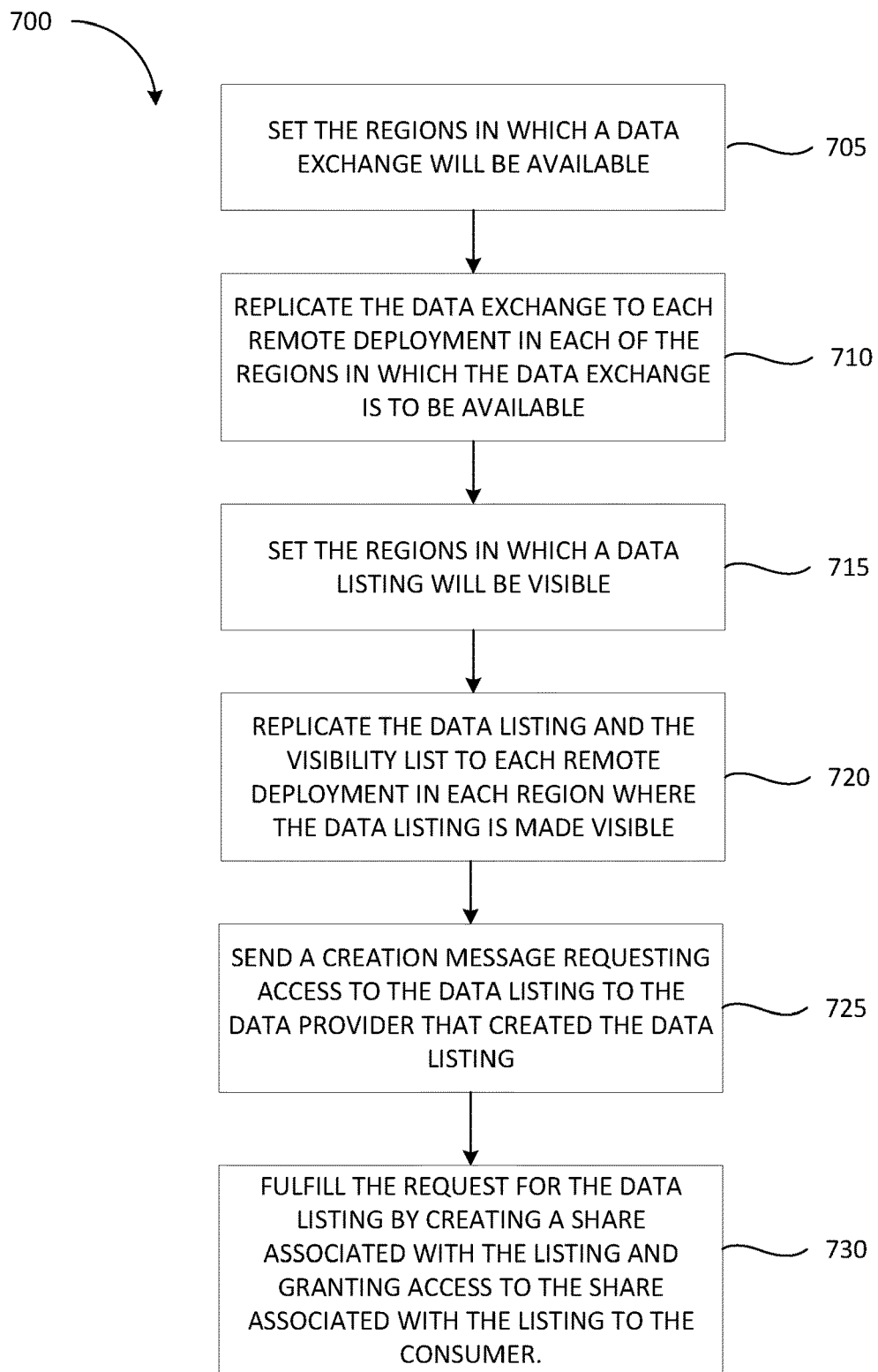
FIG. 7 is a flow diagram of a method for managing data exchange availability and data listing visibility, in accordance with some embodiments of the present invention.

FIG. 7 is a flow diagram of a method 700 for managing availability of a data exchange and visibility of data listings therein, in accordance with some embodiments. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 700 may be performed by respective processing devices of remote deployments 401 and 402 (illustrated in FIG. 4B).

Referring simultaneously to FIG. 4B, at block 705, the exchange admin may set the regions in which the data exchange DX1 will be available. The data exchange DX1 may provide functionality to allow an exchange admin on remote deployment 401 to specify the regions in which the data exchange DX1 will be available (resolvable) and from which regions customers can be added as members of the data exchange DX1. The remote deployment 401 may provide commands (e.g., SQL commands) for the exchange admin to set available regions. When an exchange admin sets the available regions for the data exchange, this information may be persisted as a list in the local database (not shown) of remote deployment 401. The local database may be any appropriate database, such as, e.g., FoundationDB. The local database of remote deployment 401 may include a number of data processing objects (DPOs) in which data pertaining to the data exchange DX1 may be stored. For example, a base dictionary DPO may comprise a set of database tables used to store information about the database's definition including information about database objects such as tables, indexes, columns, data types, and views.

One such DPO may be an available regions DPO which extends the base dictionary DPO and in which the available regions of the data exchange DX1 may be persisted. As can be seen in the example commands listed above, the exchange admin may specify the regions in which the data exchange DX1 is available on a region by region basis, instead of specifying particular remote deployments in which DX1 is available on a deployment by deployment basis. The remote deployment 401 may persist the deployment location ID of each region where the data exchange is to be made available. A deployment location ID may be represented in any suitable alpha-numeric form such as 1001 or region1 (corresponding to region 1), 1002 or region2 (corresponding to region 2). The list of available deployment location IDs can be stored as a string (defined as e.g., static final String AVAILABLE_DEPLOYMENT_LOCATION_IDS="availabledeploymentlocationIDs") within the available regions DPO, and the string may be parsed to determine the deployment location IDs of regions where the data exchange DX1 is available when a member of the data exchange DX1 wishes to know the available regions.

At block 710, the remote deployment 401 may then replicate the data exchange DX1 to each remote deployment in each of the regions in which the data exchange is to be available (as specified by the exchange admin) using the database replication method discussed hereinabove. For the global object corresponding to the data exchange DX1, remote deployment 401 may decide which remote deployment(s) the global object is to be replicated to by parsing the string of deployment location IDs from the available regions DPO to determine the list of regions where the data exchange DX1 is available.

Upon the available regions for the data exchange being set, at block 715, a data provider of the data exchange DX1 may set the regions in which their listings (e.g., listing DXL1) will be visible (e.g., set listing visibility). A listing may be a customer viewable representation of data that the data provider wishes to share. The listing may describe what the underlying data is about, contain usage examples regarding the data, and other metadata. The data provider creates the listing, and upon creation, only the data provider can see the listing. Data providers may send listings to the exchange admin for publishing approval (referred to as "listing approval" as described in further detail herein). Once approved, data providers can publish listings to be available globally, in regions where the data exchange DX1 is available.

When the data provider sets the regions in which the listing DXL1 is to be visible, this information may be persisted as a list in the local database of the remote deployment 402 (not shown). The local database of remote deployment 402 may be any suitable database such as e.g., FoundationDB and may include a listing visibility regions DPO (not shown) which extends the base dictionary DPO and in which the regions where one or more listings are visible may be persisted. As can be seen in the example commands listed above, the data provider may specify the regions in which their listings are visible on a region by region basis, instead of specifying particular deployments on which their listings are visible on a deployment by deployment basis. The list of deployment location IDs where the listing DXL1 is to be made visible can be stored as a string in the listing visibility regions DPO, and the string may be parsed to determine the deployment location IDs of regions in which the listing DXL1 is visible when the data provider or the exchange admin wishes to know the regions in which the listing DXL1 is to be visible.

When the visible regions for the listing DXL1 are set, at block 720, the remote deployment 402 may replicate the listing DXL1 and the visibility list to each remote deployment in each region where the listing DXL1 is made visible. As discussed above, the remote deployment 402 may obtain the list of regions where the listing is visible by parsing the string of deployment location IDs from the listing visibility regions DPO and may package the list of regions along with other information regarding the listing such as a type of the listing as well as metadata of the listing into a single listing information package. The remote deployment 402 may utilize the replication method described hereinabove, and when the global object corresponding to the listing DXL1 is created, it may include the listing information package.

Referring now to FIG. 5 as well, when the consumer in remote deployment 503 wishes to request the listing DXL2, they may utilize the listing metadata (included within the listing information package that is replicated with the global object corresponding to listing DXL2) that indicates who the data provider is and where they are from/their origin remote deployment to determine where to send a request to. The remote deployment 503 may utilize a global message having Global message type: DATA_EXCHANGE_LISTING_REQUEST_SYNC: This type of message may be used for managing consumers' requests to providers for listings. This includes creating, cancelling, rejecting, and fulfilling these requests, as well as cleaning requests up (expiring them) when members are removed from the data exchange or a listing is deleted. At block 725, the remote deployment 503 may send a creation message requesting access to the listing DXL2 to the remote deployment 502, which may include a local database having an access request DPO that may be used by the data provider to manage approval/denial of requests for data listings.

At block 730, the data provider in remote deployment 502 may fulfill the request for the listing DXL2 by creating a share associated with the listing and granting access to the share associated with the listing to the consumer. It should be noted that the share associated with that listing DXL2 can be created (and access to it granted by) either by the data provider or a fulfiller which is a data provider in the same remote deployment as the consumer (e.g., remote deployment 403).

Figure 8:
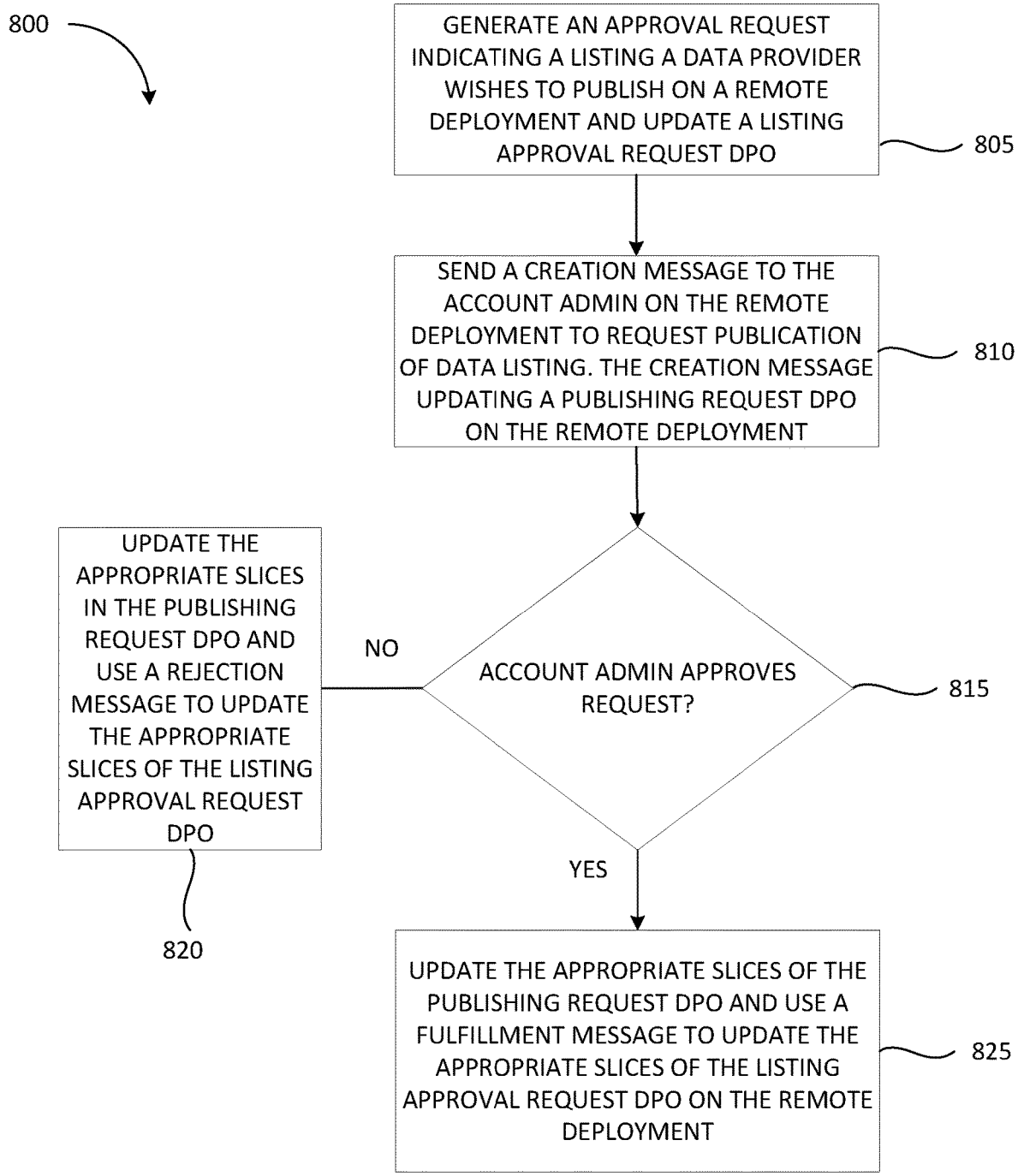
FIG. 8 is a flow diagram of a method for managing listing approval requests, in accordance with some embodiments of the present invention.

FIG. 8 is a flow diagram of a method 800 for managing listing approval requests, in accordance with some embodiments. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 800 may be performed by respective processing devices of remote deployments 401 and 402 (illustrated in FIG. 4B).

Referring also to FIG. 6, a data provider on remote deployment 602 may wish to send a request for approval to publish their listing DXL3 to the exchange admin on remote deployment 601. The data provider and the exchange admin may use a special global message type (e.g., Global message type: DATA_EXCHANGE_LISTING_APPROVAL_REQUEST_SYNC) that is used for managing requests by a data provider for approval to publish their listings including creation, cancellation, rejection, and approval of publishing requests. A publishing request DPO on the local database of remote deployment 601 may be used by the exchange admin to manage approval/denial of listing publication requests. The publishing request DPO may include a plurality of slices, where each slice is a column of data corresponding to a single value for each of one or more members of a particular dimension of a DPO. The publishing request DPO may include an "exchange admin" slice for the exchange admin, a "data provider" slice for the data provider, and an "updatedOn" slice for tracking when a request was last updated. Each of the slices may include one or more data categories such as a local entity ID of the data exchange of the requested listing, a deployment that the data exchange of the requested listing is on, a deployment that the requested listing is on, a local entity ID of the requested listing, an account ID of the listing owner (provider), a status of the request (e.g. pending, rejected, approved, etc.), a JSON string containing information for user interface (UI) display, a reason for why the request was rejected (if it was rejected), a timestamp of when the request was issued, and a timestamp of when the request was last updated. The local database of remote deployment 602 may include a separate listing approval request DPO that is identical to the publishing request DPO and is used by the data provider to manage listing publication requests.

At block 805, a data provider on remote deployment 602 may generate an approval request indicating a listing DXL3 that he/she wishes to publish on the remote deployment 601 of the exchange admin and update the (relevant data categories of the) "provider" slice of the listing approval request DPO with the information of the request. Subsequently, at block 810, the data provider (e.g., via remote deployment 602) may send a creation message to the exchange admin on remote deployment 601 to request publication of data listing DXL3 on the remote deployment 601. The creation message may write the approval request to the "exchange admin" and "updatedOn" slices of the publishing request DPO on the remote deployment 601. More specifically, the creation message may update each of the relevant data categories listed above for each of the "exchange admin" and "updatedOn" slices of the publishing request DPO with the relevant information of the approval request. The creation message may also remove any rejected or approved approval requests for the same listing from the "admin" slice.

At block 815, if the exchange admin decides to reject the approval request, it may update the "status of the request" and "reason for rejection" fields in the "exchange admin" and "updatedOn" slices of the publishing request DPO and use a rejection message to update the data provider slice of the listing approval request DPO on the remote deployment 602 at block 820. As part of updating the "data provider" slice, the rejection message may update the "status of the request" and "reason for rejection" fields in the "data provider" slice of the listing approval request DPO accordingly.

If at block 815, the exchange admin decides to grant the approval request, it may update the "status of the request" and "reason for rejection" fields in the "exchange admin" and "updatedOn" slices of the publishing request DPO and use a fulfillment message to update the data provider slice of the listing approval request DPO on the remote deployment 602 at block 825. As part of updating the data provider slice, the fulfillment message may update the "status of the request" and "reason for rejection" fields in the "data provider" slice of the listing approval request DPO accordingly.

The data provider may also utilize a cancellation message, which may remove any approval requests (with status PENDING or APPROVED or REJECTED) from the exchange admin slice of the publishing request DPO on remote deployment 401. When the data provider publishes an approved listing, the cleanup "cancels" the request on their behalf using this same code path to remove the request on the exchange admin's side.

Figure 9:
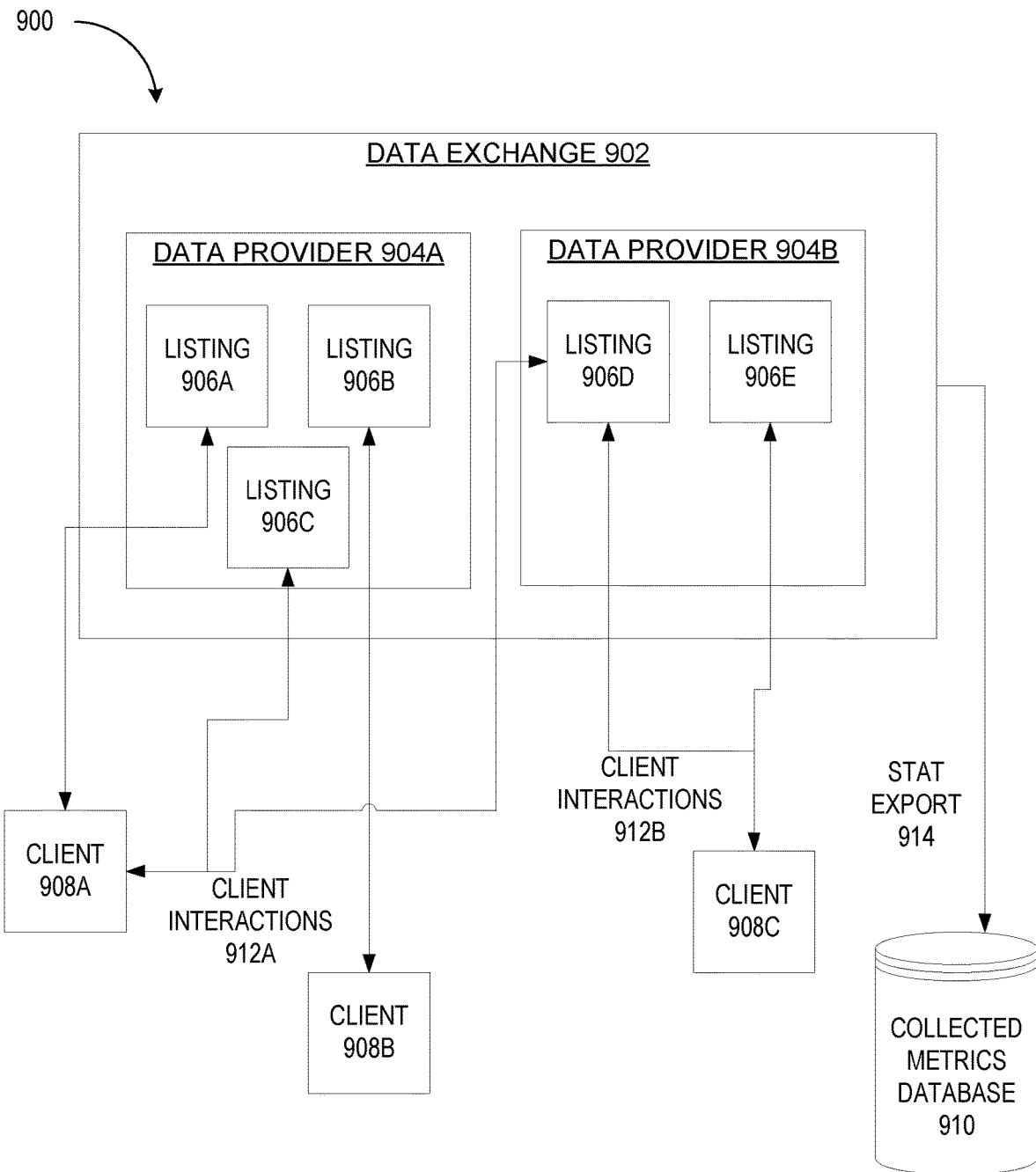
FIG. 9 is a block diagram of a data sharing platform, in accordance with some embodiments of the present invention.

FIG. 9 is a block diagram of a data sharing platform 900, in accordance with some embodiments of the present invention. In FIG. 9, the data sharing platform 900 includes data exchange 902 that is coupled to clients 908A-C. In one embodiment, the data exchange 902 is implemented using the exchange data 200 and exchange manager 124 as described in FIG. 2 above. In one embodiment, the data exchange 902 includes data listings 906A-E that are from data providers 904A-B. As illustrated in FIG. 9, data provider 904A has three data listings 906A-C and data provider 904B has to data listings 906D-E. While in one embodiment, the data exchange 902 includes two data providers 904A-B and five data listings 906A-E, in alternate embodiments, there can be more or less of each of the data providers and/or data listings. In one embodiment, a data provider is a user that shares one or more data sets using a data listing for that data set. Furthermore, each of the data listings 906A-E can be a listing as described in FIG. 2 above.

In one embodiment, the clients 908A-C can view and access each of the data listings 906A-E. In this embodiment, each of the clients 908A-C can access one or more of the data listings using an access method that is used to access a data set as known in the art (e.g., Hypertext Transport Protocol (HTTP), or some other type of access method). In one embodiment, a client can access a listing, view a listing, request a listing, mount a database query the mounted database, and/or other types of activities.

In response to the clients accessing and/or using one or more of the listings 906A-E, the cloud computing service providing the data exchange 902 can collect metrics regarding the use of the data listings 906A-E and save these metrics in a collected metrics database 910. In one embodiment, the cloud computing system can collect data for client telemetry, data set gets and requests, and exchange consumption data. In this embodiment, the client telemetry metrics are data regarding the client interaction with the data listing, gets and requests metrics are data characterizing a get and/or request of the data set, and exchange consumption metrics are data regarding the exchange that was shared. For example, and in one embodiment, the client telemetry metrics include a listing owner account deployment, listing owner account identifier, exchange name, data, region, consumer account region, listing identifier, listing name, listing clicks, request initiated, request success, consumer accounts clicks daily, consumer accounts request initiated daily, consumer accounts requests success daily, consumer accounts listing clicks monthly, consumer accounts requests initiated monthly, and consumer accounts requests success monthly. In addition, the gets and requests metrics can include listing owner account deployment, listing owner account identifier, data, exchange name, event type (e.g., get, request, and/or another type of event), region, consumer account name, listing identifier, listing name, consumer account name, consumer organization name, terms accepted, and consumer email. Furthermore, the exchange metrics can include listing owner account deployment, listing owner account identifier, date, exchange name, exchange identifier, exchange region, listing, name, listing region, listing global name, share owner account name, share name, share identifier, consumer account name, consumer organization name, consumer account region, and count successful jobs. In one embodiment, the metrics are stored under an account associated with the operator of the cloud computing service.

With the metrics stored in the metrics database, the cloud computing service processes the metrics and shares these metrics with the data providers as a shared data set. In one embodiment, the cloud computing service processes data and replicates the data to local installments of the cloud computing service. In one embodiment, because the listings can be global, a single listing can have both consumption and client telemetry metrics in a wide range of regions. In this embodiments, that metrics are shared for a given listing back to the provider's main account, where the provider published the listing from. This means that metrics will be aggregated a single region first, before sharing this data back to the provider's local account. In one embodiment, the collected metrics database 910 can include metrics data to support different granularities of metrics. For example, and in one embodiment, the metrics can be aggregated to show summarized metrics or can be exposed at different levels of granularity to allow a data provider to drill to understand the usage of one or more listings of the data provider. In this example, the metrics can illustrate consumer usage, such as number of queries executed, listings views (by consumer and totals), conversion metrics (views to requested listings to mounted databases for the listings to actual queries run on the mounted databases), listing requests, average queries per consumer, total consumers, total queries for a listing, type of access, and/or other types of metrics. In addition, the metrics can be on a table basis or a finer granularity (e.g., row or column basis). Furthermore, the metrics can be over a time period or all time to date. There can be hundreds, thousands, or more types of client interactions on a monthly, weekly, daily, or some other time period. In this embodiment, metrics of this type can allow a data provider to understand how the listings are being used.

Figure 10:
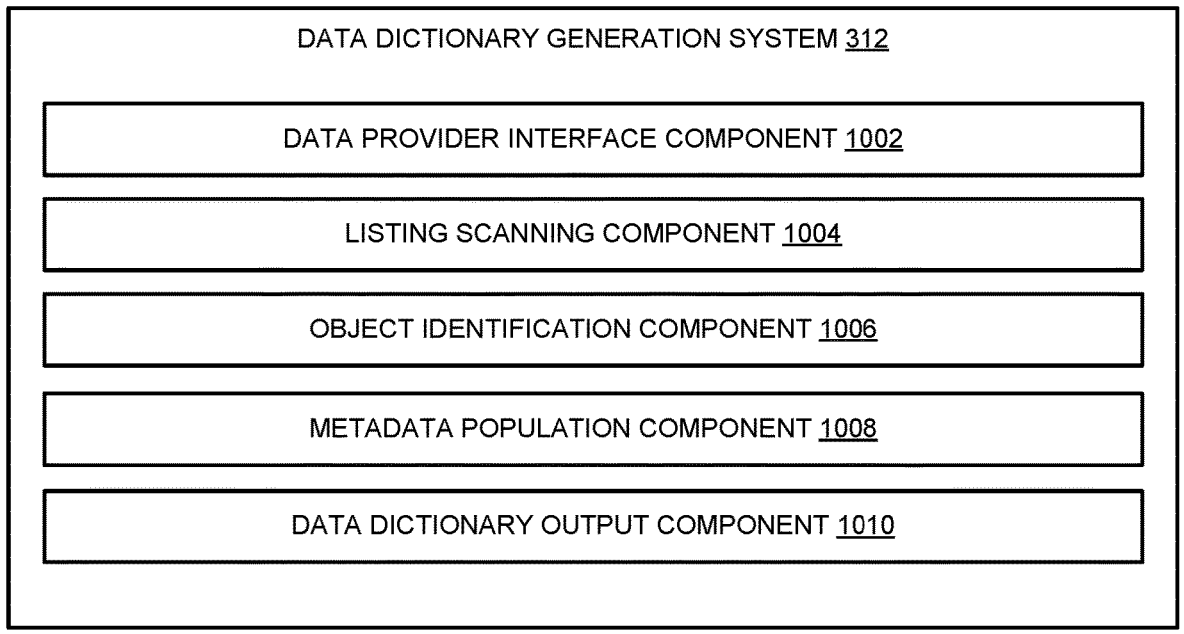
FIG. 10 is a block diagram of a data dictionary generation system, in accordance with some embodiments of the present invention.

FIG. 10 is a block diagram of a data dictionary generation system 312, in accordance with some embodiments of the present invention. As explained above, the data dictionary generation system 312 is programmed to automatically populate and update a data dictionary for each listing 202. A data dictionary includes metadata describing the shared data included in the listing 202 overall as well as metadata describing the individual objects included in the listing 202, such as the individual tables, schemas, views, functions, and the like. The shared data and each individual data object provided by the listing 202 may be described in the data dictionary by a set of data fields that corresponds to the shared dataset or the object type of the individual object. For example, the set of data fields used to describe the listing 202 may include a high-level summary of the shared data included in the listing 202, such as the number of schemas, tables, views, functions, and/or stored procedures included in the shared data. The set of data fields used to describe an individual object may provide more specific data about the object and its contents. For example, the set of data fields used to describe a table may include information describing the table (e.g., table name, description, size, number of rows, number of columns), information describing each column in the table (e.g., name, description, data type, example value), column statistics (e.g., ranges of values, frequencies), and table previews. As another example, the set of data fields used to describe a function or stored procedure may include a name of the function or stored procedure, description, parameter names and parameter types.

The metadata populated to the data dictionary can be presented to data consumers along with the description of the listing 202 when requested by data consumers. For example, the metadata populated to the data dictionary can be presented in a user interface along with the description when a data consumer selects to view a listing 202 available through a data exchange. The data provided in the data dictionary provides data consumers with a comprehensive description of the shared data provided by a listing 202, including a high-level summary of the shared data and description of each individual object included in the shared data. The information included in the data dictionary allows data consumers to understand the contents of the shared data offered by the listing 202 and how to use the shared data included in the listing 202.

As shown, the data dictionary generation system 312 includes a data provider interface component 1002, a listing scanning component 1004, an object identification component 1006, a metadata population component 1008, and data dictionary output component 1010.

The data provider interface component 1002 provides an interface that enables data providers to configure the data dictionaries that are automatically generated for their listings 202. For example, the data provider interface component 1002 may provide a user interface including various user interface elements (e.g., text boxes, checkboxes, etc.) that enables the data providers to provide input to configure the data dictionaries. In some embodiments, the interface enables data providers to select a set of featured objects for a listing. The set of featured objects may be objects included in the shared data provided by the listing 202 that the data provider would like to promote to data consumers. For example, the set of featured objects may include tables, schemas, etc., included in the shared data that the data provider believes to be of high value or importance to data consumer. The selected set of featured objects may be prioritized when presented to data consumers within a description of the listing 202. The data provider interface component 1002 may provide any received data defining the set of featured objects for a listing 202 to the other components of the data dictionary generation system 312, such as the dictionary definition output component 1010.

The listing scanning component 1004 scans listings 202 to identify any changes to share access granted to the listings 202. A change to share access granted to a listing may include a new object being shared with a listing 202, access to an object shared with the listing being revoked, and/or a modification of access to an object shared with a listing 202. Detecting a modification to the share access granted to listing 202 triggers the data dictionary generation system 312 to generate a data dictionary for the listing 202. This may include generating an initial data dictionary for the listing, such as when a new listing 202 is created, or generating an updated data dictionary for a listing 202. The listing scanning component 1004 may scan the listings 202 at specified time intervals (e.g., every 2 hours, 4 hours, etc.) and/or in response to receiving a user-initiated command to scan the listing 202 or a specific listing 202. For example, a data provider may use the user interface provided by the data provider interface component 1002 to initiate an update to the data dictionary for a listing 202.

The listing scanning component 1004 provides data to the other component of the data dictionary generating system 312 that identifies listings 202 for which a change to share access granted to the listings 202 has been detected. For example, the listing scanning component 1004 may provide the data to the object identification component 1006.

The object identification component 1006 scans listings 202 identified by the listing scanning component 1004 to identify the individual objects included in the shared data provided by the listings 202. The objects may include schemas, tables, views, functions, stored procedures, and the like included in the shared data. The object identification component 1006 may provide data identifying each of objects and its corresponding object type to the other components of the data dictionary generation system 312. For example, the object identification component 1006 may provide the data to the metadata population component 1008.

The metadata population component 1008 populates a data dictionary for a listing 202. For example, the metadata population component 1008 accesses sets of data fields corresponding to a listing 202 and each identified object included in the shared data provided by the listing 202. The data fields included in each set of data fields describe the listing or object to which they correspond. For example, the set of data fields corresponding to a listing 202 included data fields to provide a high-level summary of the shared data provided by the listing 202, such as the number of schemas, tables, views, functions, and/or stored procedures included in the shared data. The set of data fields used to describe an individual object may provide more specific data about the object and its contents. For example, the set of data fields used to describe a table may include information describing the table (e.g., table name, description, size, number of rows, number of columns), information describing each column in the table (e.g., name, description, data type, example value), column statistics (e.g., ranges of values, frequencies), and table previews. As another example, the set of data fields used to describe a function or stored procedure may include a name of the function or stored procedure, description, parameter names and parameter types.

The metadata population component 1008 populates the set of data fields for the listing 202 and each identified objects based on data extracted from the shared data provided by the listing 202. For example, the metadata population component 1008 may analyze the shared data to determine the number of schemas, tables, views, functions, and/or stored procedures included in the shared data and populate the set of data fields corresponding to a listing 202. As another example, the metadata population component 1008 may analyze a table included in the shared data to determine the table name, provided description, size, number of rows, and number of columns to populate the set of data fields. Similarly, the metadata population component 1008 may analyze each column in the table to determine name, description, data type, and example value to populate the set of data fields corresponding to the table. In some embodiments, the metadata population component 1008 may populate the set of data fields with statistics regarding an object, such as the ranges of values and frequencies included in a column or table.

The metadata population component 1008 may similarly populate sets of data fields corresponding to objects such as functions or stored procedures. For example, the metadata population component 1008 may analyze a function or stored procedure to determine a name, provided description, parameter names and/or parameter types to populate the set of data fields corresponding to the function or stored procedure.

These are just a few examples of the types of data fields that can be used to describe the shared data provided by a listing 202 and its included objects and is not meant to be limiting. The data fields may include any desired data field to describe shared data and/or an object. For example, the data fields may include the number of distinct values in a column, percentage of unique values, date of last update, frequency of updates, staleness, size, row count, count of unstructured files in a stage, percentage of rows with 0 value, percentage of rows with negative values, minimum/maximum values, standard deviation/mean, percentile values, min/max/mean string length, table/column previews, example values, and the like.

In some embodiments, a data provider may select the data fields to be included in the data dictionary and/or define data fields to be included in the data dictionary. For example, the data provider may use the interface provided by the data provider interface component 1002 to select individual data fields to describe the shared data provided by the listing 202 and/or the individual objects included in the shared data. As another example, the data provider may use the interface provided by the data provider interface component 1002 to define custom data fields, such as by defining operations to be executed by the metadata population component 1008 to populate the custom data field.

Once populated, a set of data fields provides a description of its corresponding shared data or individual object. The metadata population component 1008 may provide these generated descriptions to the other components of the data dictionary generation system 312, such as the data dictionary output component 1010.

The data dictionary output component 1010 generates and outputs the data dictionary for a listing 202 based on the descriptions (e.g., populated sets of data fields) generated by the metadata population component 1008. For example, the data dictionary output component 1010 generates a manifest file for the listing 202 that includes each of the descriptions and either adds the manifest file to the catalog 220 and/or overwrites a previous version of the manifest file corresponding to the listing 202 in the catalog 220.

In some embodiments, the data dictionary output component 1010 may generate the manifest file based on preferences provided by the data provider. For example, the data dictionary component 1010 may identify and/or order the descriptions stored in the manifest to provide higher priority to a set of featured objects defined by the data provider. This may cause the featured objects to be featured more prominently when the data dictionary is presented to a data consumer as part of the description of a listing 202. For example, the set of featured objects may be presented within a prioritized and/or highlighted portion of the user interface, presented first in a list of objects included in the shared data, and the like.

Figure 11:
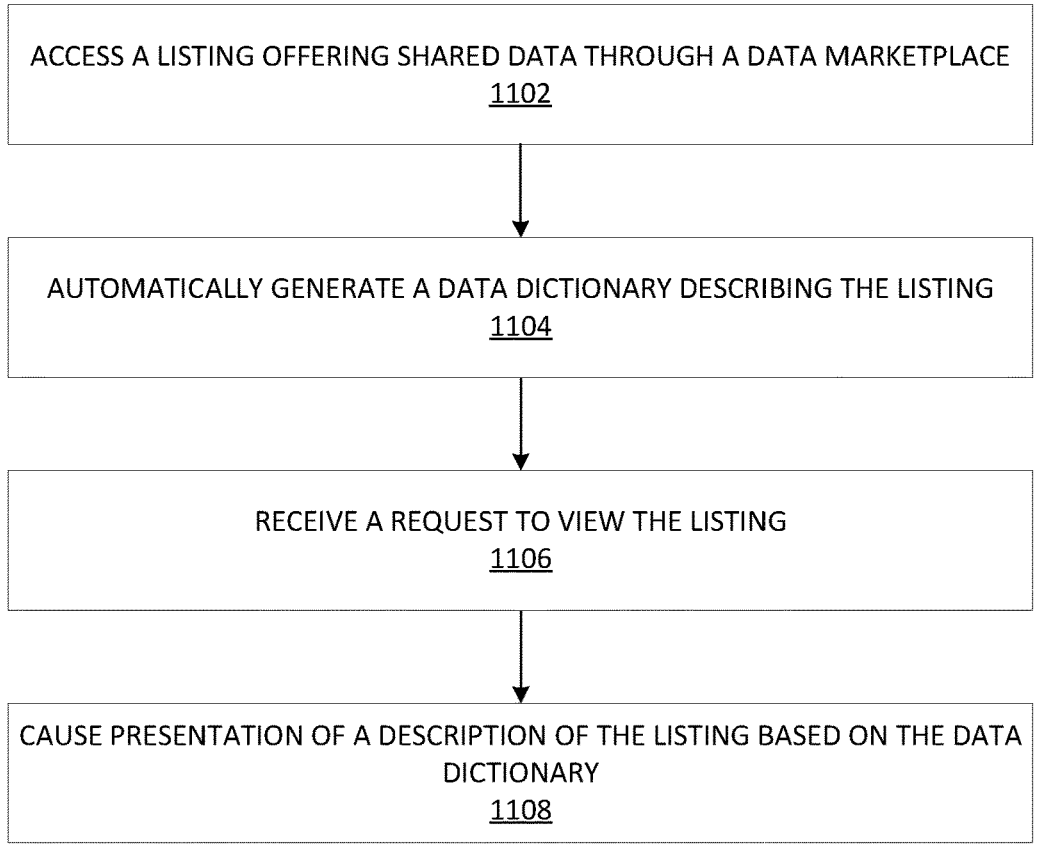
FIG. 11 is a flow diagram of a method for automatically generating a data dictionary for a listing, in accordance with some embodiments of the present invention.

FIG. 11 is a flow diagram of a method 1100 for automatically generating a data dictionary for a listing, in accordance with some embodiments of the present invention.

At operation 1102, the data dictionary generation system 312 accesses a listing 202 offering shared data through a data marketplace.

At operation 1104, the data dictionary generation system 312 automatically generates a data dictionary describing the listing 202. To generate the data dictionary for a listing 202, the data dictionary generation system 312 analyzes the shared data provided by the listing 202 to identify objects included in the shared data. The data dictionary generation system 312 identifies a set of data fields associated with each identified object and populates the set of data fields associated with each identified object based on the shared data offered by the listing 202. For example, the data dictionary generation system 312 may access the title of a table to populate a table name data field, count the number of columns included in a table to populate the number of columns data field, and the like. The data dictionary generated by the data dictionary generation system 312 can be populated to a manifest file associated with the listing 202. For example, the manifest file may be stored in the catalog 220, from which the stored data dictionary can be subsequently accessed and used to generate the description for the listing 202. In some embodiments, the data dictionary generation system 312 may generate the data dictionary using one or more of the methods described in relation to FIGS. 13-16.

At operation 1106, the exchange manager 124 receives a request to view the listing 202. The request may be received from a client device of a data consumer.

At operation 1108, the exchange manager 124 causes presentation of a description of the listing 202 based on the data dictionary. For example, the exchange manager 124 may access the manifest file for the listing 202 from the catalog 220 and generate the description of the listing 202 including the data dictionary. An example presentation of a listing 202 that includes a data dictionary is discussed below in relation to FIGS. 18 and 19.

Figure 12:
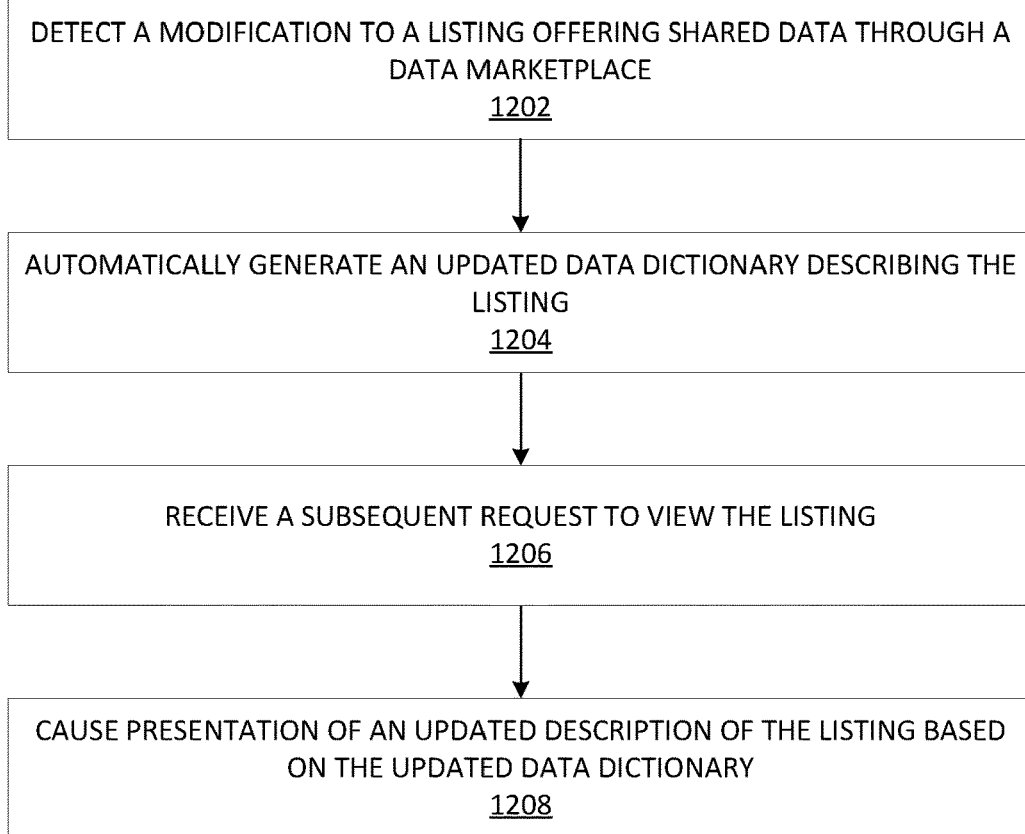
FIG. 12 is a flow diagram of a method for automatically updating a data dictionary for a listing, in accordance with some embodiments of the present invention.

FIG. 12 is a flow diagram of a method 1200 for automatically updating a data dictionary for a listing, in accordance with some embodiments of the present invention.

At operation 1202, the data dictionary generation system 312 detects a modification to a listing offering shared data through a data marketplace. To ensure that a data dictionary for each listing 202 is generated and remains up to date as the shared data provided by the listing is updated, the data dictionary generation system 312 periodically scans the listings 202 to identify any changes to share access granted to the listings 202. For example, the data dictionary generation system 312 determines whether a listing 202 has been granted access to a new object, has had access to an object revoked, or whether access to an object has been modified.

If a change to the share access granted to a listing 202 is detected, at operation 1204, the data dictionary generation system 312 automatically generates an updated data dictionary describing the listing. For example, the data dictionary generation system 312 analyzes the shared data provided by the listing 202 to identify objects included in the shared data. The data dictionary generation system 312 identifies a set of data fields associated with each identified object and populates the set of data fields associated with each identified object based on the shared data offered by the listing 202. For example, the data dictionary generation system 312 may access the title of a table to populate a table name data field, count the number of columns included in a table to populate the number of columns data field, and the like. The updated data dictionary generated by the data dictionary generation system 312 can be populated to a manifest file associated with the listing 202 to provide an updated description of the listing 202. For example, the manifest file may be stored in the catalog 220, from which the stored data dictionary can be subsequently accessed and used to generate the description for the listing 202. In some embodiments, the data dictionary generation system 312 may generate the data dictionary using one or more of the methods described in relation to FIGS. 13-16.

At operation 1206, the exchange manager 124 receives a subsequent request to view the listing. The request may be received from a client device of a data consumer.

At operation 1208, the exchange manager 124 causes the presentation of an updated description of the listing based on the updated data dictionary. For example, the exchange manager 124 may access the manifest file for the listing 202 from the catalog 220 and generate the description of the listing 202 including the updated data dictionary. An example presentation of a listing 202 that includes a data dictionary is discussed below in relation to FIGS. 18 and 19.

FIG. 13 is a flow diagram of a method 1300 for generating metadata to populate a data dictionary, in accordance with some embodiments of the present invention. A data dictionary includes metadata describing the shared data included in the listing 202 overall as well as metadata describing the individual objects included in the listing 202, such as the individual tables, schemas, views, functions, and the like. The shared data and each individual data object provided by the listing 202 may be described in the data dictionary by a set of data fields that corresponds to the shared dataset or the object type of the individual object. For example, the set of data fields used to describe the listing 202 may include a high-level summary of the shared data included in the listing 202, such as the number of schemas, tables, views, functions, and/or stored procedures included in the shared data. The set of data fields used to describe an individual object may provide more specific data about the object and its contents. For example, the set of data fields used to describe a table may include information describing the table (e.g., table name, description, size, number of rows, number of columns), information describing each column in the table (e.g., name, description, data type, example value), column statistics (e.g., ranges of values, frequencies), and table previews. As another example, the set of data fields used to describe a function or stored procedure may include a name of the function or stored procedure, description, parameter names and parameter types.

At operation 1302, the data dictionary generation system 312 generates metadata describing a set of data objects included in shared data offered by a listing. The metadata describing a set of data objects provides a high-level summary of the shared data included in the listing 202, such as the number of schemas, tables, views, functions, and/or stored procedures included in the shared data.

At operation 1304, the data dictionary generation system 312 generates metadata describing each individual data object included in the set of data objects. The metadata describing each individual data object provides more specific data about the data object and its contents. For example, the set of data fields used to describe a table may include information describing the table (e.g., table name, description, size, number of rows, number of columns), information describing each column in the table (e.g., name, description, data type, example value), column statistics (e.g., ranges of values, frequencies), and table previews. As another example, the set of data fields used to describe a function or stored procedure may include a name of the function or stored procedure, description, parameter names and parameter types.

At operation 1306, the data dictionary generation system 312 generates a data dictionary for the listing based on the metadata describing the set of data objects and the metadata describing each individual data object included in the set of data objects.

FIG. 14 is a flow diagram of a method 1400 for generating metadata describing a table to populate a data dictionary, in accordance with some embodiments of the present invention.

At operation 1402, the data dictionary generation system 312 generates metadata describing a table included in the shared data offered by a listing. For example, the metadata describing the table may include information describing the table (e.g., table name, description, size, number of rows, number of columns).

At operation 1404, the data dictionary generation system 312 generates metadata describing each individual column included in the table. The metadata describing each individual column may include the column name, description, data type of values included in the columns, and an example value, as well as generated column statistics, such as ranges of values, the frequency of values in the column.

At operation 1406, the data dictionary generation system 312 generates a portion of the data dictionary for the listing that describes the table based on the metadata describing the table and the metadata describing each individual column included in the table. This portion of the data dictionary may be combined with additional metadata describing the set of objects in the shared data provided by the listing 202 as a whole (e.g., high-level overview) as well as metadata describing each of the other objects included in the shared data.

Figure 15:
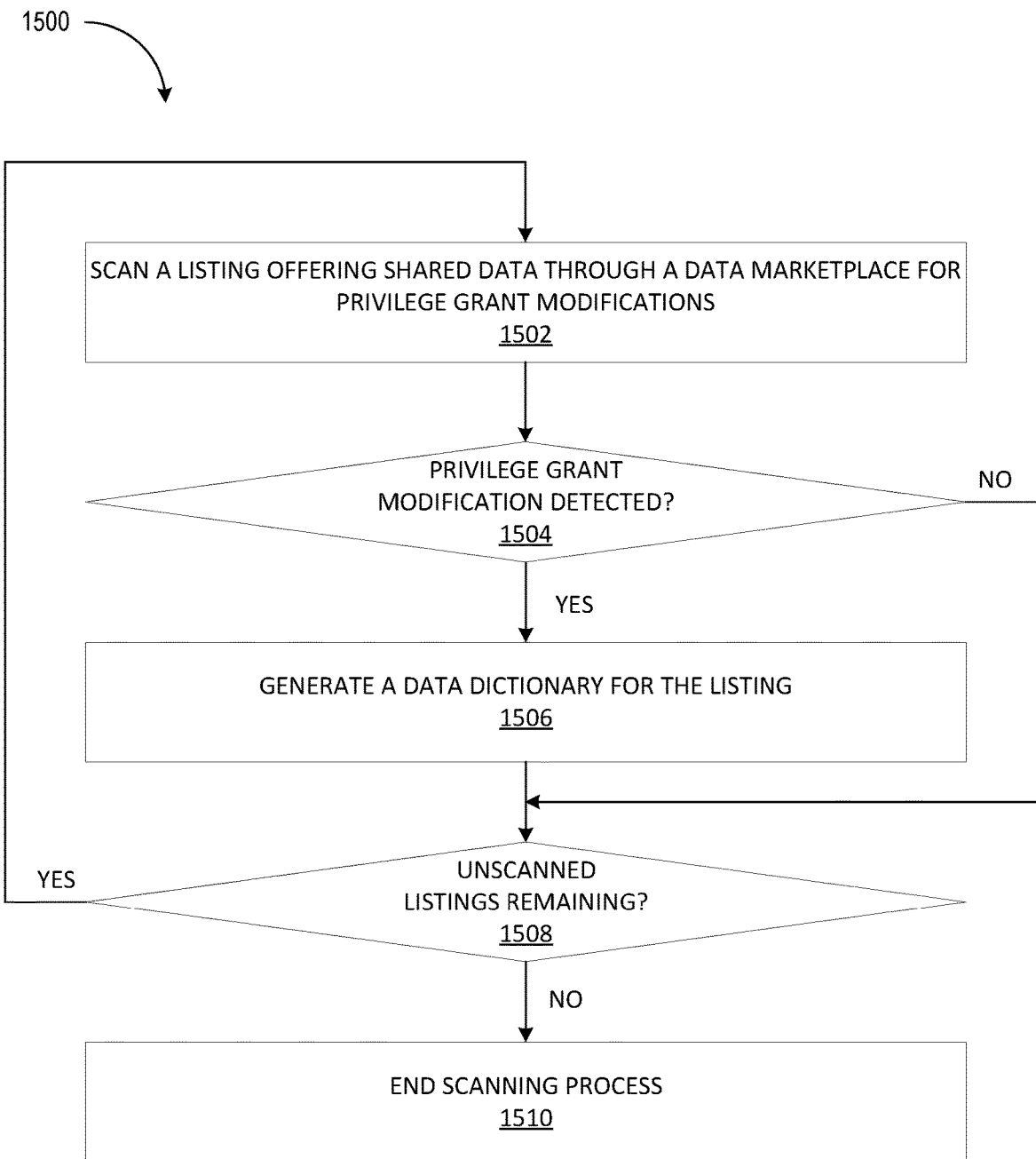
FIG. 15 is a flow diagram of a method for generating data dictionaries for multiple listings, in accordance with some embodiments of the present invention.

FIG. 15 is a flow diagram of a method 1500 for generating data dictionaries for multiple listings, in accordance with some embodiments of the present invention.

At operation 1502, the listing scanning component 1004 scans a listing 202 offering shared data through a data marketplace for privilege grant modifications. A change to share access granted to a listing 202 may include a new object being shared with a listing 202, access to an object shared with the listing being revoked, and/or a modification of access to an object shared with a listing 202. Detecting a modification to the share access granted to listing 202 triggers the data dictionary generation system 312 to generate a data dictionary for the listing 202. This may include generating an initial data dictionary for the listing, such as when a new listing 202 is created, or generating an updated data dictionary for a listing 202. The listing scanning component 1004 may scan the listings 202 at specified time intervals (e.g., every 2 hours, 4 hours, etc.) and/or in response to receiving a user-initiated command to scan the listing 202 or a specific listing 202. For example, a data provider may use the user interface provided by the data provider interface component 1002 to initiate an update to the data dictionary for a listing 202.

If at operation 1504, the listing scanning component 1004 determines that a privilege grant modification is detected, the method 1500 continues to operation 1506, where the data dictionary generation system 312 generates a data dictionary for the listing 202. For example, the data dictionary generation system 312 may generate the data dictionary using the method 1600 described in relation to FIG. 16. Alternatively, if the listing scanning component 1004 determines that a privilege grant modification is not detected, the method 1500 continues to operation 1508 where the listing scanning component 1004 determines whether any listings 202 remain unscanned. Similarly, after the data dictionary generation system 312 generates a data dictionary for the listing 202, the method continues to operation 1508.

If at operation 1508, the listing scanning component 1004 determines that there are listings 202 remaining that have not yet been scanned, the method 1500 returns to operation 1502 where the listing scanning component 1004 scans one of the unscanned listings 202 for privilege grant modifications. Alternatively, if at operation 1508, the listing scanning component 1004 determines that there are no listings 202 remaining that have not yet been scanned (e.g., each of the listings 202 has been scanned), the method 1500 continues to operation 1510 and ends the scanning process. The listing scanning component 1004 may repeat the method 1500 at predetermined intervals and/or in response to a user input to generate new and updated data dictionary definitions for each of the listings 202 offered in the data marketplace.

Figure 16:
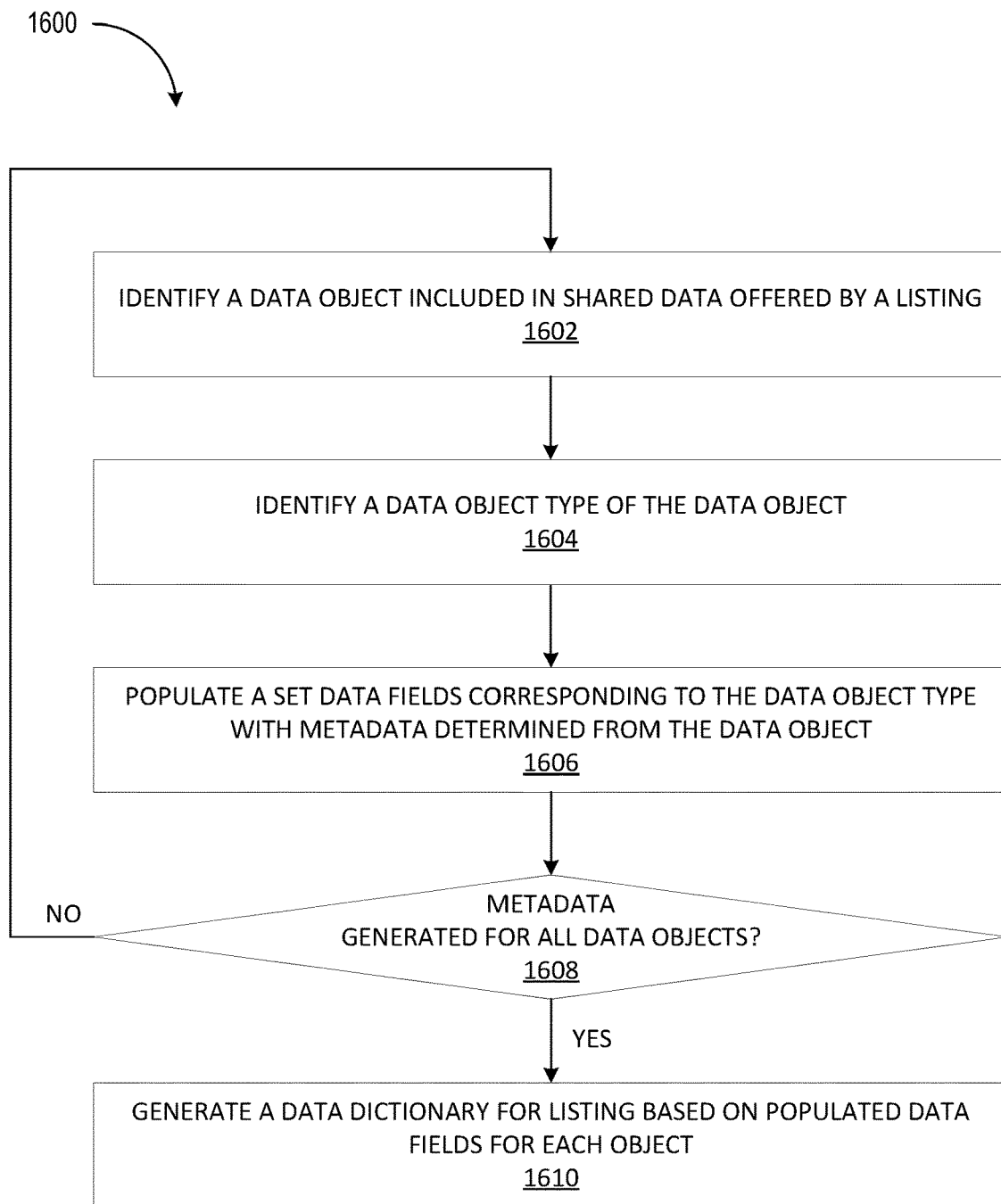
FIG. 16 is a flow diagram of a method for generating metadata for each data object in shared data offered by a listing to populate a data dictionary, in accordance with some embodiments of the present invention.

FIG. 16 is a flow diagram of a method 1600 for generating metadata for each data object in shared data offered by a listing 202 to populate a data dictionary, in accordance with some embodiments of the present invention.

At operation 1602, the object identification component 1006 identifies a data object included in shared data offered by a listing 202. The object identification component 1006 scans listings 202 identified by the listing scanning component 1004 to identify the individual objects included in the shared data provided by the listings 202. The objects may include schemas, tables, views, functions, stored procedures, and the like included in the shared data. The object identification component 1006 may provide data identifying each of objects and its corresponding object type to the other components of the data dictionary generation system 312. For example, the object identification component 1006 may provide the data to the metadata population component 1008.

At operation 1604, the metadata population component 1008 identifies a data object type of the data object. The metadata population component 1008 populates a data dictionary for a listing 202. For example, the metadata population component 1008 accesses sets of data fields corresponding to a listing 202 and each identified object included in the shared data provided by the listing 202. The data fields included in each set of data fields describe the listing or object to which they correspond. For example, the set of data fields corresponding to a listing 202 included data fields to provide a high-level summary of the shared data provided by the listing 202, such as the number of schemas, tables, views, functions, and/or stored procedures included in the shared data. The set of data fields used to describe an individual object may provide more specific data about the object and its contents. For example, the set of data fields used to describe a table may include information describing the table (e.g., table name, description, size, number of rows, number of columns), information describing each column in the table (e.g., name, description, data type, example value), column statistics (e.g., ranges of values, frequencies), and table previews. As another example, the set of data fields used to describe a function or stored procedure may include a name of the function or stored procedure, description, parameter names and parameter types.

At operation 1606, the metadata population component 1008 populates a set of data fields corresponding to the data object type with metadata determined from the data object. The metadata population component 1008 populates the set of data fields for the listing 202 and each identified objects based on data extracted from the shared data provided by the listing 202. For example, the metadata population component 1008 may analyze the shared data to determine the number of schemas, tables, views, functions, and/or stored procedures included in the shared data and populate the set of data fields corresponding to a listing 202. As another example, the metadata population component 1008 may analyze a table included in the shared data to determine the table name, provided description, size, number of rows, and number of columns to populate the set of data fields. Similarly, the metadata population component 1008 may analyze each column in the table to determine name, description, data type, and example value to populate the set of data fields corresponding to the table. In some embodiments, the metadata population component 1008 may populate the set of data fields with statistics regarding an object, such as the ranges of values and frequencies included in a column or table.

The metadata population component 1008 may similarly populate sets of data fields corresponding to objects such as functions or stored procedures. For example, the metadata population component 1008 may analyze a function or stored procedure to determine a name, provided description, parameter names and/or parameter types to populate the set of data fields corresponding to the function or stored procedure.

These are just a few examples of the types of data fields that can be used to describe the shared data provided by a listing 202 and its included objects and is not meant to be limiting. The data fields may include any desired data field to describe shared data and/or an object. For example, the data fields may include the number of distinct values in a column, percentage of unique values, date of last update, frequency of updates, staleness, size, row count, count of unstructured files in a stage, percentage of rows with 0 value, percentage of rows with negative values, minimum/maximum values, standard deviation/mean, percentile values, min/max/mean string length, table/column previews, example values, and the like.

In some embodiments, a data provider may select the data fields to be included in the data dictionary and/or define data fields to be included in the data dictionary. For example, the data provider may use the interface provided by the data provider interface component 1002 to select individual data fields to describe the shared data provided by the listing 202 and/or the individual objects included in the shared data. As another example, the data provider may use the interface provided by the data provider interface component 1002 to define custom data fields, such as by defining operations to be executed by the metadata population component 1008 to populate the custom data field.

Once populated, a set of data fields provides a description of its corresponding shared data or individual object. The metadata population component 1008 may provide these generated descriptions to the other components of the data dictionary generation system 312, such as the data dictionary output component 1010.

At operation 1608, the object identification component 1006 determines whether metadata has been generated for all of the objects included in the shared data. If metadata has not been generated for all of the data objects, the method 1600 returns to operation 1602 where the object identification component 1006 identifies another data object included in the shared data for which metadata has not been generated. Alternatively, if at operation 1608 the object identification component 1006 determines that metadata has been generated for all of the data objects included in the listing, at operation 1610 the data dictionary output component 1010 generates a data dictionary for the listing 202 based on the populated data fields for each object. The data dictionary output component 1010 generates and outputs the data dictionary for a listing 202 based on the descriptions (e.g., populated sets of data fields) generated by the metadata population component 1008. For example, the data dictionary output component 1010 generates a manifest file for the listing 202 that includes each of the descriptions and either adds the manifest file to the catalog 220 and/or overwrites a previous version of the manifest file corresponding to the listing 202 in the catalog 220.

In some embodiments, the data dictionary output component 1010 may generate the manifest file based on preferences provided by the data provider. For example, the data dictionary component 1010 may identify and/or order the descriptions stored in the manifest to provide higher priority to a set of featured objects defined by the data provider. This may cause the featured objects to be featured more prominently when the data dictionary is presented to a data consumer as part of the description of a listing 202. For example, the set of featured objects may be presented within a prioritized and/or highlighted portion of the user interface, presented first in a list of objects included in the shared data, and the like.

Figure 17:
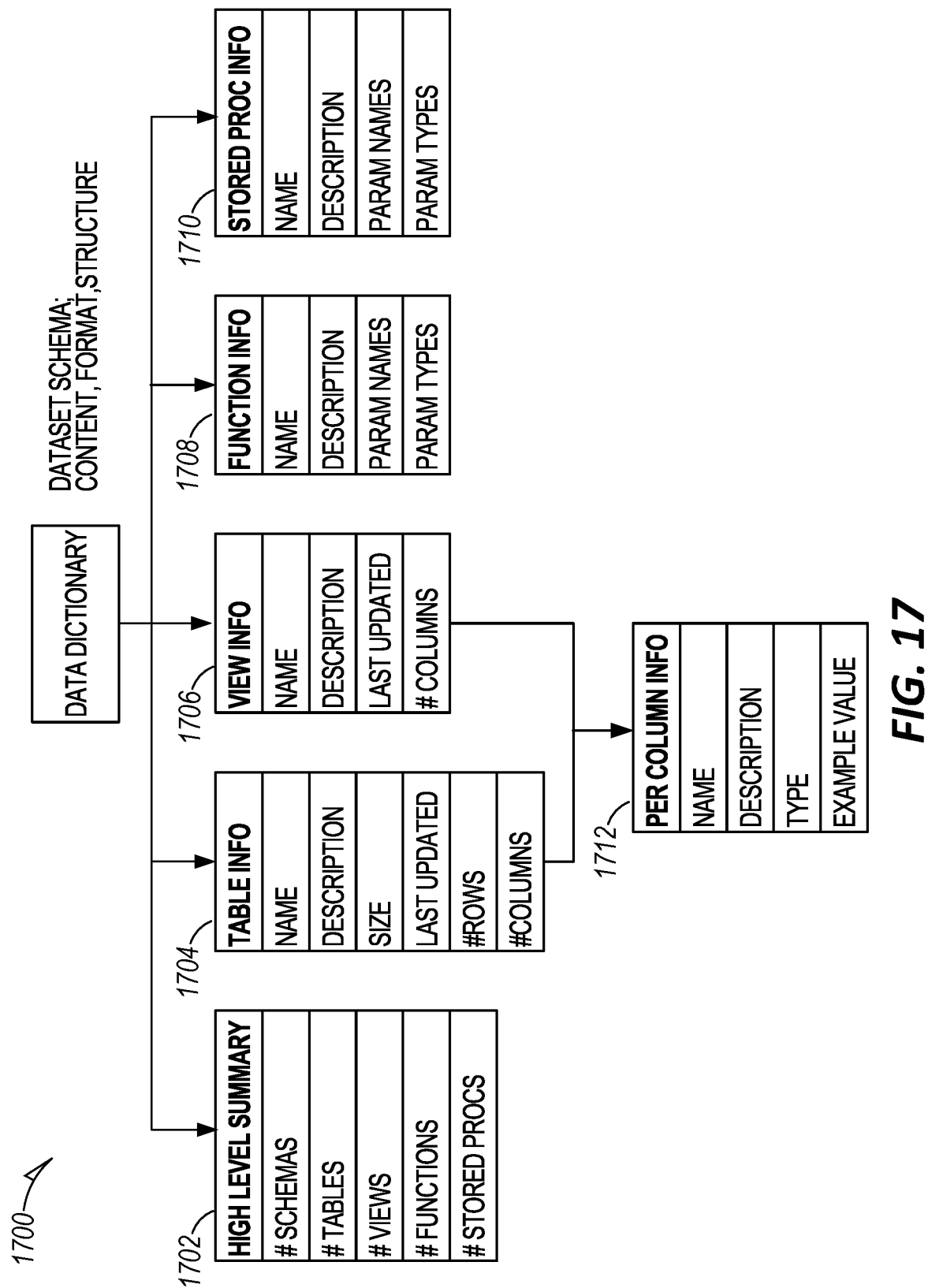
FIG. 17 is a block diagram illustrating a data dictionary schema, in accordance with some embodiments of the present invention.

FIG. 17 is a block diagram illustrating a data dictionary schema 1700, in accordance with some embodiments of the present invention. As shown, the data dictionary schema 1700 includes a high-level summary 1702 of the shared data provided by the listing 202, table information 1704 describing the tables included in the shared data, view information 1706 describing views in the shared data, function information 1708 describing functions in the shared data and stored procedure information 1710 describing stored procedures in the shared data. Per column information 1712 is also provided for each table and view in the shared data. As shown, each of the objects includes a set of data fields. For example, the high-level summary information 1702 includes a number of schemas, tables, views, functions and stored procedures in the shared data. The table information 1704 includes a name, description, size, last update, number of rows and number of columns in a table. The view information 1706 includes a name, description, last update and number of columns in the view. The function information 1708 and stored procedure information 1710 both include the name, description, parameter names and parameter types of the function or stored procedure. Similarly, the per column information 1712 includes a name, description, data value type, and example value for each column included in a table or view.

FIG. 18 is a block diagram of a user interface 1800 presenting a description of a listing with a data dictionary, in accordance with some embodiments of the present invention. As shown, the user interface 1800 includes a description of the listing 1802, including a written description 1804 and price 1806. Further, the user interface 1800 includes a data dictionary 1808 generated for the listing. The data dictionary 1808 allows a data consumer to view information describing a group of objects included in the shared data, such as tables, views and functions. In some embodiments, a set of featured objects selected by a data provider may be included in the user interface. The user interface 1800 also includes a button 1810 to view additional columns included in a dataset.

Figure 19:
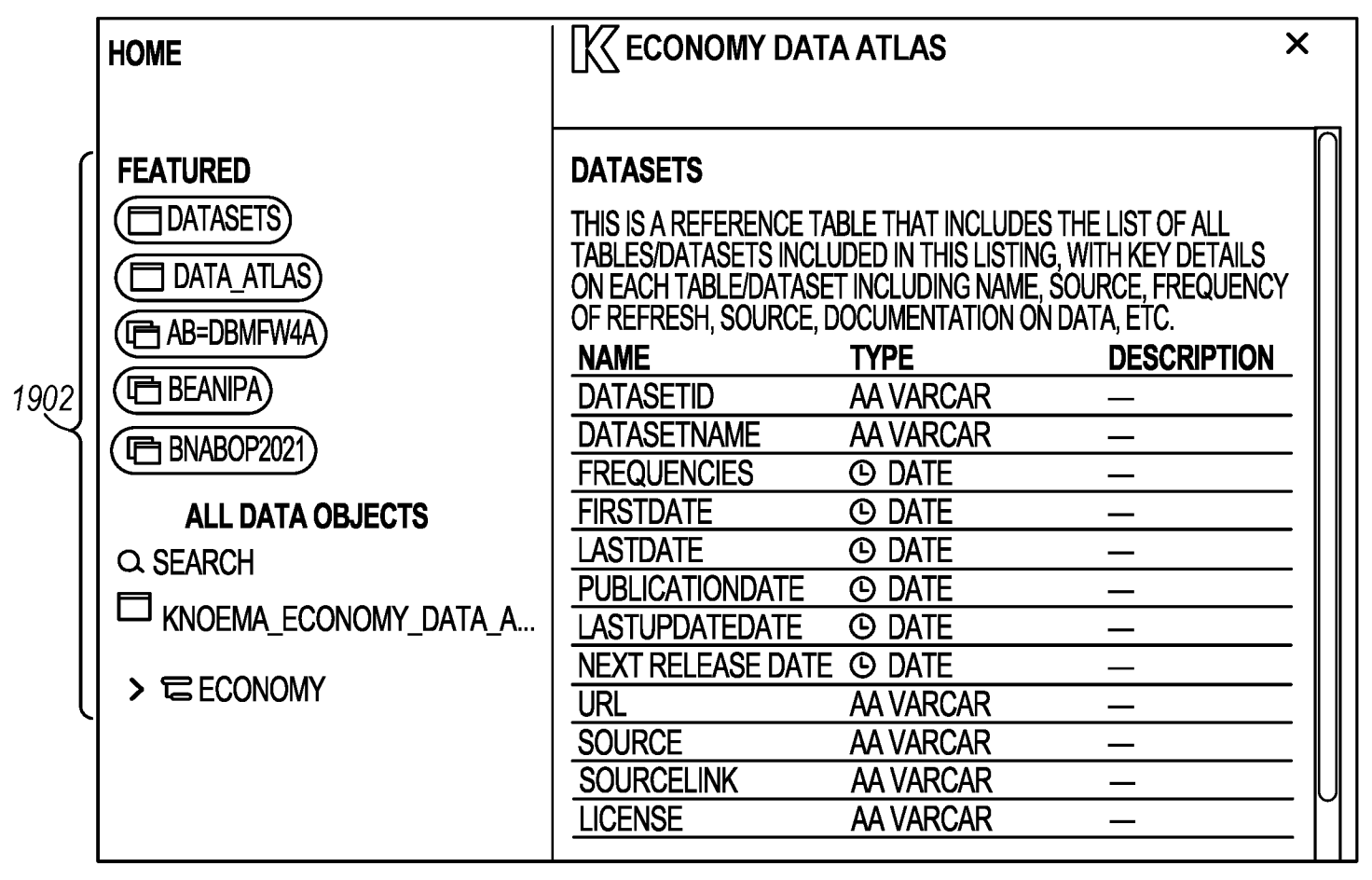

FIG. 19 is a block diagram of another user interface 1900 presenting a description of a listing with a data dictionary, in accordance with some embodiments of the present invention. The shown user interface 1900 may be presented when a data consumer selects the button 1810 to view the additional columns included in the dataset for the listing shown in FIG. 18. The user interface 1900 includes an object explorer 1902 that allows a data consumer to cause presentation of the data dictionary describing various objects included in the shared data provided by the listing.

FIG. 20 is a block diagram of a user interface 2000 presented to a data provider, in accordance with some embodiments of the present invention. The user interface 2000 enables a data provider to configure the data dictionary that is automatically generated for their listing 202. As shown, the user interface 2000 allows a data provider to define basic information 2002 for the listing 202, such as a data access setting, profile, title, subtitle, data update frequency and category. The user interface 2000 also allows a data provider to define details 2004 for the listing 202, such as by providing a description and/or a link to documentation. The user interface 2000 also allows a data provider to add data about the data product 2006, such as defining a secure share, featured data objects to be highlighted in the listing, attributes, and pricing.

Figure 21:
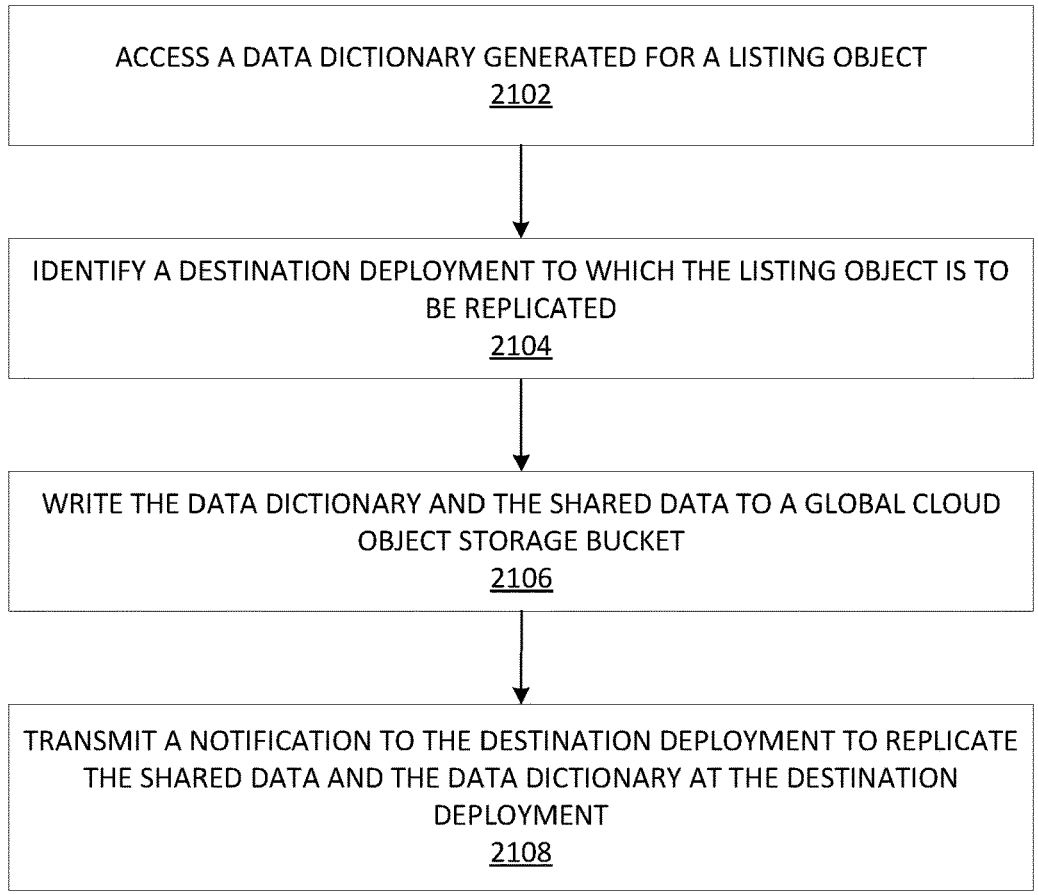
FIG. 21 is a flow diagram of a method for distributing a listing from a source deployment to a destination deployment, in accordance with some embodiments of the present invention.

FIG. 21 is a flow diagram of a method 2100 for distributing a listing from a source deployment to a destination deployment, in accordance with some embodiments of the present invention.

At operation 2102, the data listing distribution component 314 accesses a data dictionary generated for a listing object. The data dictionary may be accessed from a local storage at the source deployment. For example, the local storage may be a local cloud object storage bucket associated with the listing 202 (e.g., listing object) offered at the source deployment. The data dictionary may have been generated by the exchange manager 124 at the source deployment. For example, the data dictionary may have been generated in response to detecting a privilege grant modification in relation to the listing 202 and stored as a manifest file in the local storage at the source deployment.

At operation 2104, the data listing distribution component 314 identifies a destination deployment to which the listing object is to be replicated. For example, the data listing distribution component 314 may identify the destination deployment based on the region visibility associated with the listing object. The region visibility for the listing object defines the available regions in which the listing 202 may be distributed, for example, as described in relation to FIG. 4B.

At operation 2106, the data listing distribution component 314 writes the data dictionary and the shared data to a global cloud object storage bucket. The data listing distribution component 314 may access the shared data (e.g., individual objects included in the shared data) based on the information included in the data dictionary for the listing. The global cloud object storage bucket may be associated with the destination deployment and/or listing 202. That is, data stored in the global cloud object storage bucket may be accessible to the destination deployment for replication to the destination deployment. The global cloud object storage bucket utilizes the messaging framework and replication methods discussed in relation to FIGS. 4A and 4B to replicate the data to the destination deployment. For example, storing data to the global cloud object storage bucket may cause occurrence of specified functionality to cause replication of the data written to the global cloud object storage bucket to the destination deployment. Accordingly, at operation 2108, the data listing distribution component 314 transmits a notification to the destination deployment to replicate the shared data and the data dictionary at the destination deployment. The notification causes the destination deployment to replicate the data locally at the destination deployment to provide the listing within a geographic region associated with the destination deployment. For example, an exchange manager 124 at the destination deployment writes the shared data and the data dictionary from the global cloud object storage bucket to a local storage at the destination deployment and overwrites a manifest file associated with the listing 202, as described in relation to FIG. 22.

Figure 22:
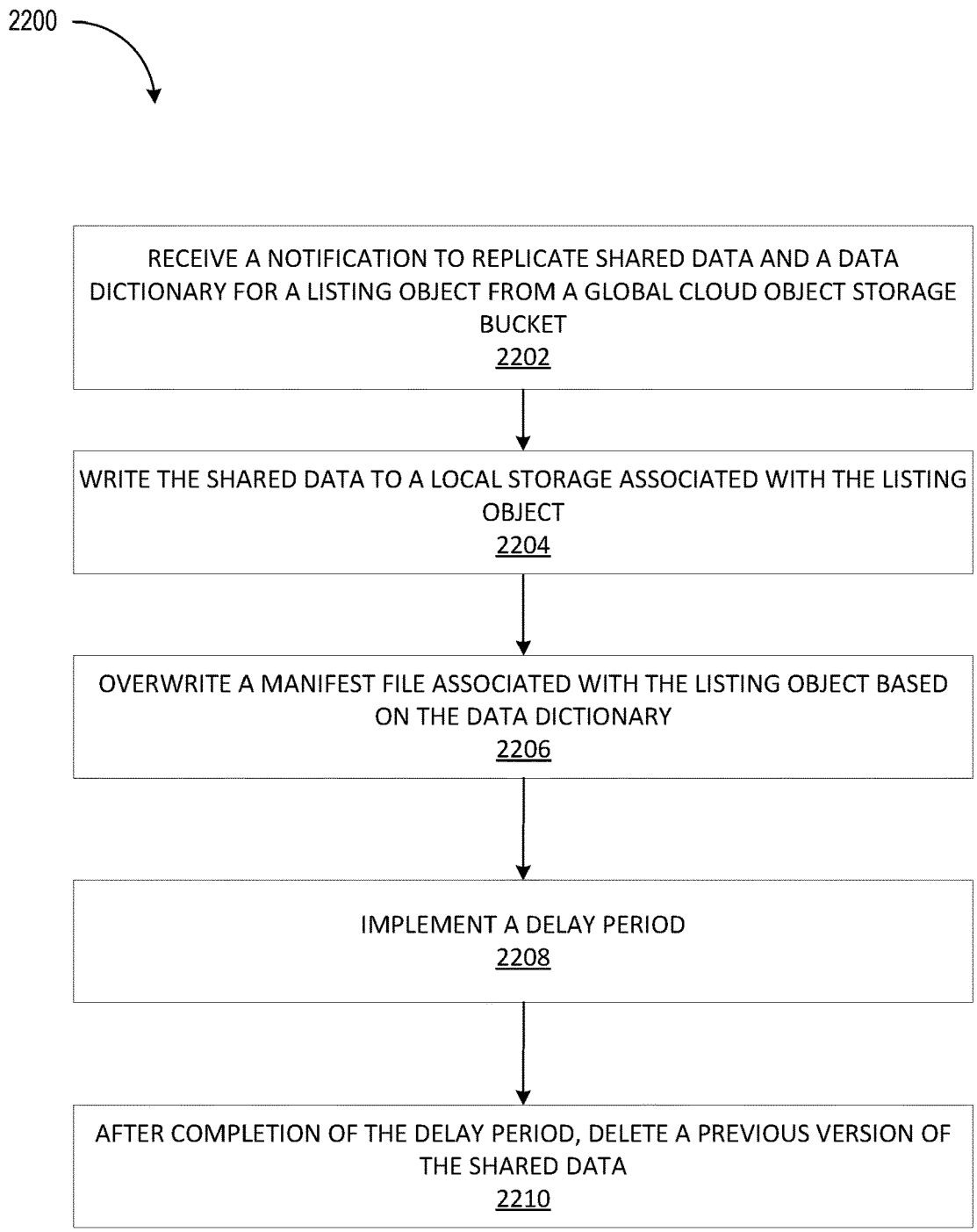
FIG. 22 is a flow diagram of a method for replicating a listing at a destination deployment, in accordance with some embodiments of the present invention.

FIG. 22 is a flow diagram of a method 2200 for replicating a listing at a destination deployment, in accordance with some embodiments of the present invention.

At operation 2202, the destination deployment (e.g., exchange manager 124 at the destination deployment) receives a notification to replicate shared data and a data dictionary from a listing object from a global object storage bucket.

At operation 2204, the destination deployment writes the shared data to a local storage associated with the listing object. In some embodiments, the local storage is a local object storage bucket associated with the listing 202.

At operation 2206, the destination deployment overwrites a manifest file associated with the listing object based on the data dictionary. The manifest file includes the data dictionary and identifiers pointing to the shared data replicated to the destination deployment. For example, the manifest file may include pointers to each object from the shared data that was replicated to the destination deployment.

At operation 2208, the destination deployment implements a delay period. The delay period provides time before the previous version of the shared data stored at the destination deployment is deleted. This provides time for any access or operations being performed in relation to the previous version of the shared data to be completed. The delay period may be any desired length of time, such as 24 hours, 48 hours, and the like.

After completion of the delay period, at operation 2210, the destination deployment deletes the previous version of the shared data.

Figure 23:
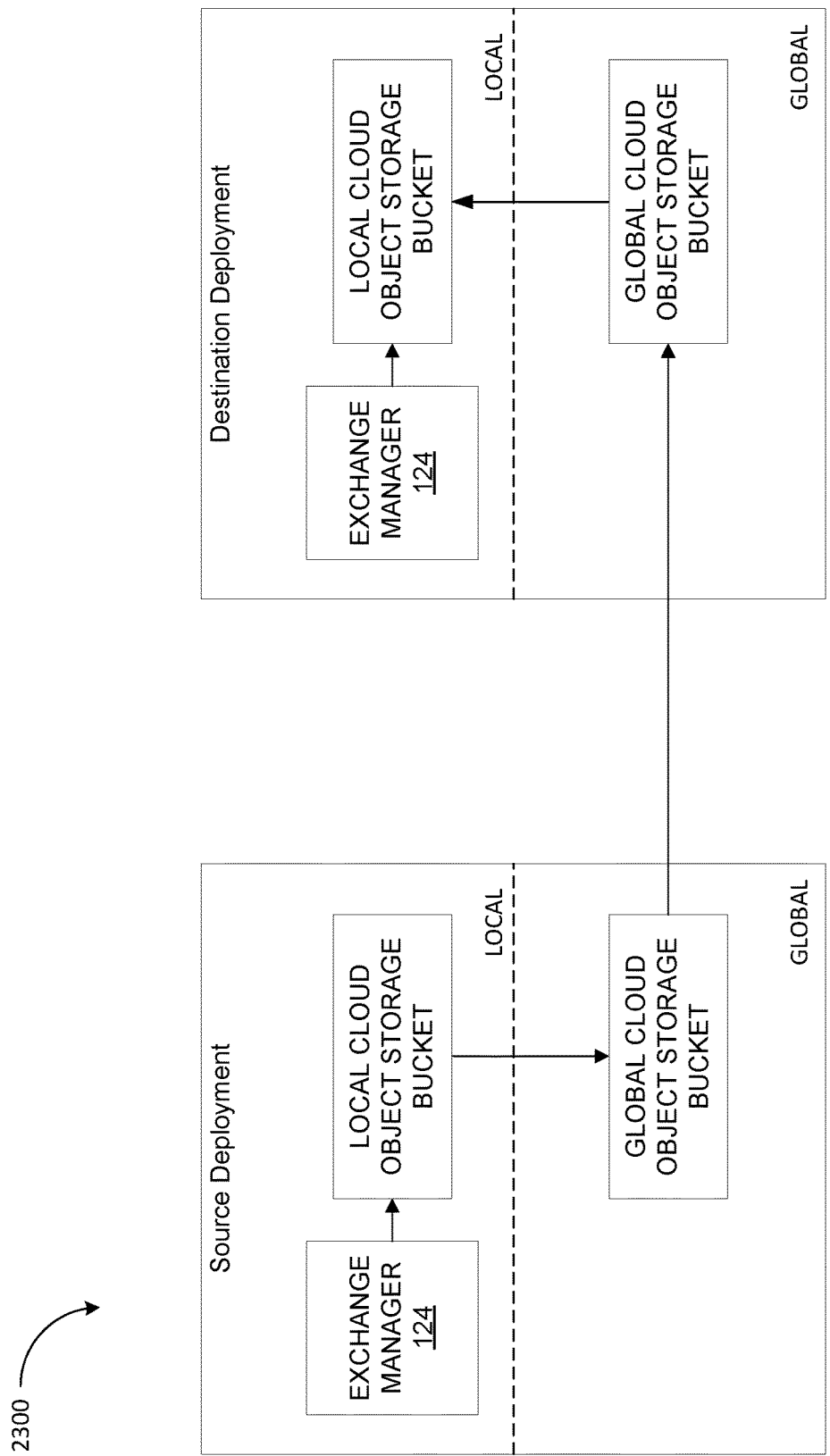
FIG. 23 is a block diagram of a system for distributing a listing from a source deployment to a destination deployment, in accordance with some embodiments of the present invention.

FIG. 23 is a block diagram of a system 2300 for distributing a listing from a source deployment to a destination deployment, in accordance with some embodiments of the present invention. As shown, a source deployment and a destination deployment both include an exchange manager, local cloud object storage bucket and a global cloud storage bucket. At the source deployment, the exchange manager 124 generates a data dictionary for a listing 202. The exchange manager 124 stores the data dictionary at the local cloud object storage bucket of the source deployment. To distribute the listing 202 to the destination deployment, the exchange manager 124 (e.g., data listing distribution component 314) identifies destination deployments to which the listing object is to be replicated. For example, the data listing distribution component 314 may identify the destination deployment based on the region visibility associated with the listing object. The region visibility for the listing object defines the available regions in which the listing 202 may be distributed, for example, as described in relation to FIG. 4B.

Upon determining that the listing object is to be replicated to the destination deployment, the exchange manager 124 writes the data dictionary for the listing 202 and the shared data offered by the listing to the global cloud object storage bucket. The exchange manager 124 may access the shared data (e.g., individual objects included in the shared data) based on the information included in the data dictionary for the listing 202. The global cloud object storage bucket may be associated with the destination deployment and/or listing 202. That is, data stored in the global cloud object storage bucket may be accessible to the destination deployment for replication to the destination deployment. The global cloud object storage bucket utilizes the messaging framework and replication methods discussed in relation to FIGS. 4A and 4B to replicate the data to the destination deployment. For example, storing data to the global cloud object storage bucket may cause occurrence of specified functionality to cause replication of the data written to the global cloud object storage bucket to the destination deployment Accordingly, the exchange manager 124 transmits a notification to the destination deployment to replicate the shared data and the data dictionary at the destination deployment.

The notification causes the destination deployment to replicate the data locally at the destination deployment to provide the listing within a geographic region associated with the destination deployment. For example, the exchange manager 124 at the destination deployment writes the shared data and the data dictionary from the global cloud object storage bucket to a local storage at the destination deployment and overwrites a manifest file associated with the listing 202, as described in relation to FIG. 22.

Described implementations of the subject matter can include one or more features, alone or in combination as illustrated below by way of example.

Example 1 is a method comprising: accessing, at a source deployment, a data dictionary generated for a listing object, the data dictionary describing shared data offered by the listing object; identifying, by at least one hardware processor, a destination deployment to which the listing object is to be replicated; writing the data dictionary and the shared data offered by the listing object to a global cloud object storage bucket associated with the destination deployment; and based on writing the data dictionary and the shared data offered by the listing object to the global cloud object storage bucket, transmitting a notification to the destination deployment, the notification causing the destination deployment to replicate the shared data and the data dictionary at the destination deployment.

In Example 2, the subject matter of Example 1 includes, wherein the notification is transmitted using a global messaging framework that defines a corresponding processing function to the notification.

In Example 3, the subject matter of any of Examples 1-2 includes, wherein the destination deployment uses the shared data and the data dictionary replicated at the destination deployment to provide the shared data offered by the listing object at the destination deployment and a description of the shared data that includes the data dictionary.

In Example 4, the subject matter of any of Examples 1-3 includes, the shared data and the data dictionary replicated at the destination deployment replaces a previous version of the shared data and the data dictionary replicated at the destination deployment.

In Example 5, the subject matter of any of Examples 1-4 includes, wherein the destination deployment replaces the previous version of the shared data and the data dictionary replicated at the destination deployment by overwriting a manifest file associated with the listing object to point to the shared data and the data dictionary replicated at the destination deployment and deletes the previous version of the shared data and the data dictionary replicated at the destination deployment.

In Example 6, the subject matter of any of Examples 1-5 includes, wherein the destination deployment implements a delay period between overwriting the manifest file and deleting the previous version of the shared data and the data dictionary.

In Example 7, the subject matter of any of Examples 1-6 further comprises: generating the data dictionary for the listing object; and writing the data dictionary to a local cloud object storage bucket of the source deployment, wherein the data dictionary is accessed from the local cloud object storage bucket.

In Example 8, the subject matter of any of Examples 1-7 includes, wherein the data dictionary for the listing object is generated in response to detecting a privilege grant modification to the listing object.

In Example 9, the subject matter of any of Examples 1-8 further comprises: accessing an updated data dictionary generated for the listing object, the updated data dictionary describing updated shared data offered by the listing object; identifying the destination deployment to which the listing object is to be replicated; writing the updated data dictionary and the updated shared data offered by the listing object to the global cloud object storage bucket associated with the destination deployment; and based on writing the updated data dictionary and the updated shared data offered by the listing object to the global cloud object storage bucket, transmitting a subsequent notification to the destination deployment, the subsequent notification causing the destination deployment to replicate the updated shared data and the updated data dictionary at the destination deployment.

In Example 10, the subject matter of any of Examples 1-9 includes, wherein identifying the destination deployment to which the listing object is to be replicated comprises: accessing a region visibility associated with the listing object, the region visibility identifying remote deployment at which the listing object is authorized to offer the shared data.

Example 11 is a system comprising: one or more computer processors; and one or more computer-readable mediums storing instructions that, when executed by the one or more computer processors, cause the system to perform operations comprising: accessing, at a source deployment, a data dictionary generated for a listing object, the data dictionary describing shared data offered by the listing object; identifying a destination deployment to which the listing object is to be replicated; writing the data dictionary and the shared data offered by the listing object to a global cloud object storage bucket associated with the destination deployment; and based on writing the data dictionary and the shared data offered by the listing object to the global cloud object storage bucket, transmitting a notification to the destination deployment, the notification causing the destination deployment to replicate the shared data and the data dictionary at the destination deployment.

In Example 12, the subject matter of Example 11 includes, wherein the notification is transmitted using a global messaging framework that defines a corresponding processing function to the notification.

In Example 13, the subject matter of any of Examples 11-12 includes, wherein the destination deployment uses the shared data and the data dictionary replicated at the destination deployment to provide the shared data offered by the listing object at the destination deployment and a description of the shared data that includes the data dictionary.

In Example 14, the subject matter of any of Examples 11-13 includes, the shared data and the data dictionary replicated at the destination deployment replaces a previous version of the shared data and the data dictionary replicated at the destination deployment.

In Example 15, the subject matter of any of Examples 11-14 includes, wherein the destination deployment replaces the previous version of the shared data and the data dictionary replicated at the destination deployment by overwriting a manifest file associated with the listing object to point to the shared data and the data dictionary replicated at the destination deployment and deletes the previous version of the shared data and the data dictionary replicated at the destination deployment.

In Example 16, the subject matter of any of Examples 11-15 includes, wherein the destination deployment implements a delay period between overwriting the manifest file and deleting the previous version of the shared data and the data dictionary.

In Example 17, the subject matter of any of Examples 11-16 includes, the operations further comprising: generating the data dictionary for the listing object; and writing the data dictionary to a local cloud object storage bucket of the source deployment, wherein the data dictionary is accessed from the local cloud object storage bucket.

In Example 18, the subject matter of any of Examples 11-17 includes, wherein the data dictionary for the listing object is generated in response to detecting a privilege grant modification to the listing object.

In Example 19, the subject matter of any of Examples 11-18 includes, the operations further comprising: accessing an updated data dictionary generated for the listing object, the updated data dictionary describing updated shared data offered by the listing object; identifying the destination deployment to which the listing object is to be replicated; writing the updated data dictionary and the updated shared data offered by the listing object to the global cloud object storage bucket associated with the destination deployment; and based on writing the updated data dictionary and the updated shared data offered by the listing object to the global cloud object storage bucket, transmitting a subsequent notification to the destination deployment, the subsequent notification causing the destination deployment to replicate the updated shared data and the updated data dictionary at the destination deployment.

In Example 20, the subject matter of any of Examples 11-19 includes, wherein identifying the destination deployment to which the listing object is to be replicated comprises: accessing a region visibility associated with the listing object, the region visibility identifying remote deployment at which the listing object is authorized to offer the shared data.

Example 21 is a computer-storage medium storing instructions that, when executed by one or more computer processors of one or more computing devices, cause the one or more computing devices to perform operations comprising: accessing, at a source deployment, a data dictionary generated for a listing object, the data dictionary describing shared data offered by the listing object; identifying a destination deployment to which the listing object is to be replicated; writing the data dictionary and the shared data offered by the listing object to a global cloud object storage bucket associated with the destination deployment; and based on writing the data dictionary and the shared data offered by the listing object to the global cloud object storage bucket, transmitting a notification to the destination deployment, the notification causing the destination deployment to replicate the shared data and the data dictionary at the destination deployment.

In Example 22, the subject matter of Example 21 includes, wherein the notification is transmitted using a global messaging framework that defines a corresponding processing function to the notification.

In Example 23, the subject matter of any of Examples 21-22 includes, wherein the destination deployment uses the shared data and the data dictionary replicated at the destination deployment to provide the shared data offered by the listing object at the destination deployment and a description of the shared data that includes the data dictionary.

In Example 24, the subject matter of any of Examples 21-23 includes, the shared data and the data dictionary replicated at the destination deployment replaces a previous version of the shared data and the data dictionary replicated at the destination deployment.

In Example 25, the subject matter of any of Examples 21-24 includes, wherein the destination deployment replaces the previous version of the shared data and the data dictionary replicated at the destination deployment by overwriting a manifest file associated with the listing object to point to the shared data and the data dictionary replicated at the destination deployment and deletes the previous version of the shared data and the data dictionary replicated at the destination deployment.

In Example 26, the subject matter of any of Examples 21-25 includes, wherein the destination deployment implements a delay period between overwriting the manifest file and deleting the previous version of the shared data and the data dictionary.

In Example 27, the subject matter of any of Examples 21-26 includes, the operations further comprising: generating the data dictionary for the listing object; and writing the data dictionary to a local cloud object storage bucket of the source deployment, wherein the data dictionary is accessed from the local cloud object storage bucket.

In Example 28, the subject matter of any of Examples 21-27 includes, wherein the data dictionary for the listing object is generated in response to detecting a privilege grant modification to the listing object.

In Example 29, the subject matter of any of Examples 21-28 includes, the operations further comprising: accessing an updated data dictionary generated for the listing object, the updated data dictionary describing updated shared data offered by the listing object; identifying the destination deployment to which the listing object is to be replicated; writing the updated data dictionary and the updated shared data offered by the listing object to the global cloud object storage bucket associated with the destination deployment; and based on writing the updated data dictionary and the updated shared data offered by the listing object to the global cloud object storage bucket, transmitting a subsequent notification to the destination deployment, the subsequent notification causing the destination deployment to replicate the updated shared data and the updated data dictionary at the destination deployment.

In Example 30, the subject matter of any of Examples 21-29 includes, wherein identifying the destination deployment to which the listing object is to be replicated comprises: accessing a region visibility associated with the listing object, the region visibility identifying remote deployment at which the listing object is authorized to offer the shared data.

Figure 24:
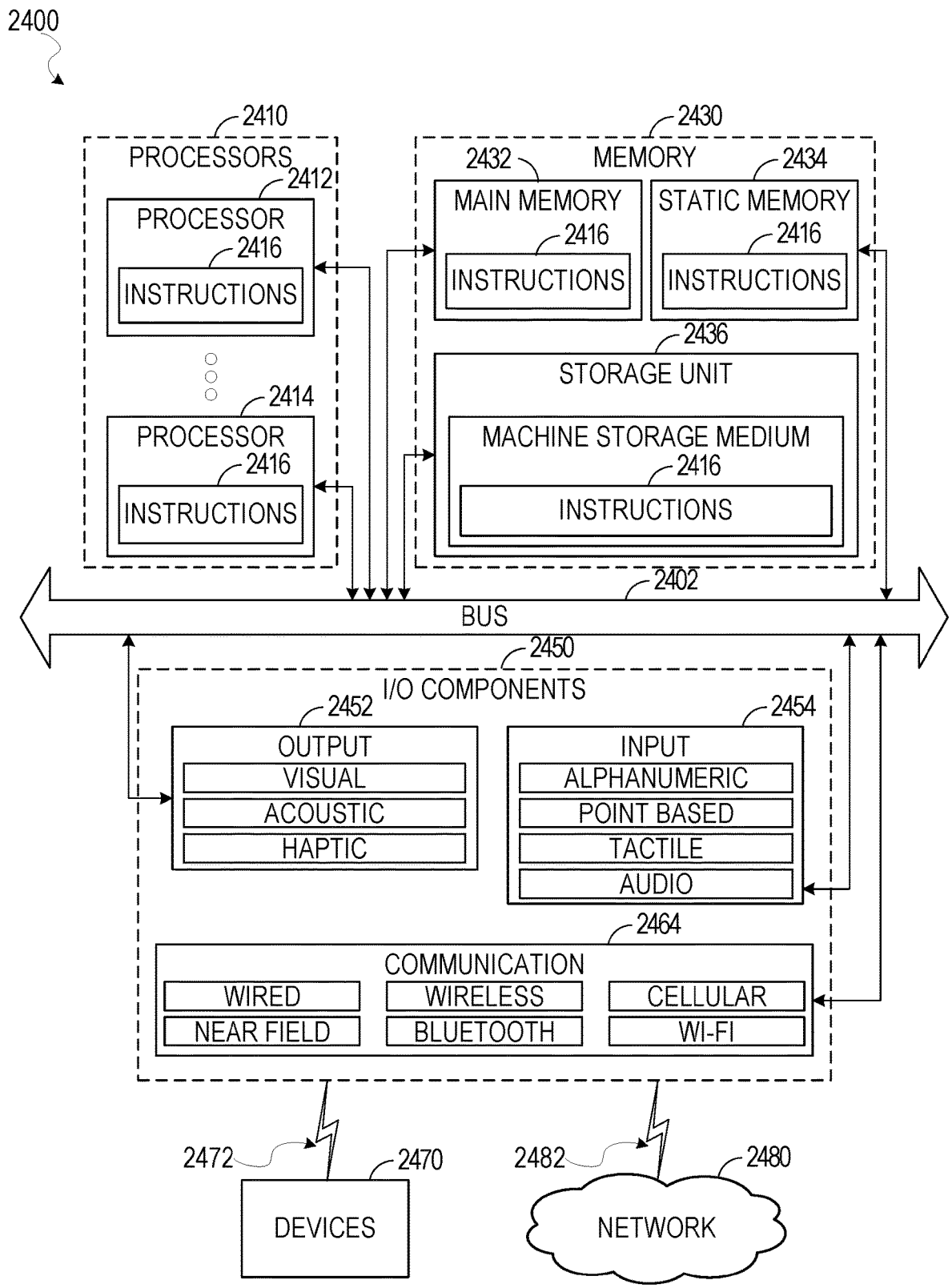
FIG. 24 illustrates a diagrammatic representation of a machine in the form of a computer system within which a set of instructions may be executed for causing the machine to perform any one or more of the methodologies discussed herein, in accordance with some embodiments of the present disclosure.

FIG. 24 illustrates a diagrammatic representation of a machine 2400 in the form of a computer system within which a set of instructions may be executed for causing the machine 2400 to perform any one or more of the methodologies discussed herein, according to an example embodiment. Specifically, FIG. 24 shows a diagrammatic representation of the machine 2400 in the example form of a computer system, within which instructions 2416 (e.g., software, a program, an application, an applet, an app, or other executable code) for causing the machine 2400 to perform any one or more of the methodologies discussed herein may be executed. For example, the instructions 2416 may cause the machine 2400 to execute any one or more operations of the methods shown in FIGS. 7, 8, 11-16, 21 and 22. As another example, the instructions 2416 may cause the machine 2400 to implement portions of the functionality illustrated in any one or more of the FIGS. 1-6, 9, 10, 17-20 and 23. In this way, the instructions 2416 transform a general, non-programmed machine into a particular machine 2400 that is specially configured to carry out any one of the described and illustrated functions in the manner described herein.

In alternative embodiments, the machine 2400 operates as a standalone device or may be coupled (e.g., networked) to other machines. In a networked deployment, the machine 2400 may operate in the capacity of a server machine or a client machine in a server-client network environment, or as a peer machine in a peer-to-peer (or distributed) network environment. The machine 2400 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 2416, sequentially or otherwise, that specify actions to be taken by the machine 2400. Further, while only a single machine 2400 is illustrated, the term "machine" shall also be taken to include a collection of machines 2400 that individually or jointly execute the instructions 2416 to perform any one or more of the methodologies discussed herein.

The machine 2400 includes processors 2410, memory 2430, and input/output (I/O) components 2450 configured to communicate with each other such as via a bus 2402. In an example embodiment, the processors 2410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 2414 and a processor 2412 that may execute the instructions 2416. The term "processor" is intended to include multi-core processors 2410 that may comprise two or more independent processors (sometimes referred to as "cores") that may execute instructions 2416 contemporaneously. Although FIG. 24 shows multiple processors 2410, the machine 2400 may include a single processor with a single core, a single processor with multiple cores (e.g., a multi-core processor), multiple processors with a single core, multiple processors with multiple cores, or any combination thereof.

The memory 2430 may include a main memory 2432, a static memory 2434, and a storage unit 2436, all accessible to the processors 2410 such as via the bus 2402. The main memory 2432, the static memory 2434, and the storage unit 2436 store the instructions 2416 embodying any one or more of the methodologies or functions described herein. The instructions 2416 may also reside, completely or partially, within the main memory 2432, within the static memory 2434, within the storage unit 2436, within at least one of the processors 2410 (e.g., within the processor's cache memory), or any suitable combination thereof, during execution thereof by the machine 2400.

The I/O components 2450 include components to receive input, provide output, produce output, transmit information, exchange information, capture measurements, and so on. The specific I/O components 2450 that are included in a particular machine 2400 will depend on the type of machine. For example, portable machines such as mobile phones will likely include a touch input device or other such input mechanisms, while a headless server machine will likely not include such a touch input device. It will be appreciated that the I/O components 2450 may include many other components that are not shown in FIG. 24. The I/O components 2450 are grouped according to functionality merely for simplifying the following discussion and the grouping is in no way limiting. In various example embodiments, the I/O components 2450 may include output components 2452 and input components 2454. The output components 2452 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 2454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 2450 may include communication components 2464 operable to couple the machine 2400 to a network 2480 or devices 2470 via a coupling 2482 and a coupling 2472, respectively. For example, the communication components 2464 may include a network interface component or another suitable device to interface with the network 2480. In further examples, the communication components 2464 may include wired communication components, wireless communication components, cellular communication components, and other communication components to provide communication via other modalities. The devices 2470 may be another machine or any of a wide variety of peripheral devices (e.g., a peripheral device coupled via a universal serial bus (USB)). For example, as noted above, the machine 2400 may correspond to any one of the components of the cloud computing service 112, and the devices 2470 may include the data storage devices or any other computing device described herein.

The various memories (e.g., 2430, 2432, 2434, and/or memory of the processor(s) 2410 and/or the storage unit 2436) may store one or more sets of instructions 2416 and data structures (e.g., software) embodying or utilized by any one or more of the methodologies or functions described herein. These instructions 2416, when executed by the processor(s) 2410, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 2480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 2480 or a portion of the network 2480 may include a wireless or cellular network, and the coupling 2482 may be a Code Division Multiple Access (CDMA) connection, a Global System for Mobile communications (GSM) connection, or another type of cellular or wireless coupling. In this example, the coupling 2482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 2416 may be transmitted or received over the network 2480 using a transmission medium via a network interface device (e.g., a network interface component included in the communication components 2464) and utilizing any one of a number of well-known transfer protocols (e.g., hypertext transfer protocol (HTTP)). Similarly, the instructions 2416 may be transmitted or received using a transmission medium via the coupling 2472 (e.g., a peer-to-peer coupling) to the devices 2470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 2416 for execution by the machine 2400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of the methods 700, 800, 1100, 1200, 1300, 1400, 1500, and 1600 may be performed by one or more processors. The performance of certain of the operations may be distributed among the one or more processors, not only residing within a single machine, but also deployed across a number of machines. In some example embodiments, the processor or processors may be in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
    accessing, at a source deployment, a data dictionary generated for a listing object, the data dictionary describing shared data offered by the listing object;
    identifying, by at least one hardware processor, a destination deployment to which the listing object is to be replicated;
    writing the data dictionary and the shared data offered by the listing object to a global cloud object storage bucket associated with the destination deployment;
    based on writing the data dictionary and the shared data offered by the listing object to the global cloud object storage bucket, transmitting a notification to the destination deployment, the notification causing the destination deployment to replicate the shared data and the data dictionary at the destination deployment;
    selectively controlling visibility of the shared data and the data dictionary to consumers at the destination deployment based on a comparison of a deployment location identifier with region information corresponding to the listing object; and
    based on writing an updated data dictionary, transmitting a subsequent notification to the destination deployment, the subsequent notification causing the destination deployment to replicate the updated shared data and the updated data dictionary at the destination deployment.

2. The method of claim 1, wherein the notification is transmitted using a global messaging framework that defines a corresponding processing function to the notification.

3. The method of claim 1, wherein the destination deployment uses the shared data and the data dictionary replicated at the destination deployment to provide the shared data offered by the listing object at the destination deployment and a description of the shared data that includes the data dictionary.

4. The method of claim 3, the shared data and the data dictionary replicated at the destination deployment replaces a previous version of the shared data and the data dictionary replicated at the destination deployment.

5. The method of claim 4, wherein the destination deployment replaces the previous version of the shared data and the data dictionary replicated at the destination deployment by overwriting a manifest file associated with the listing object to point to the shared data and the data dictionary replicated at the destination deployment and deletes the previous version of the shared data and the data dictionary replicated at the destination deployment.

6. The method of claim 5, wherein the destination deployment implements a delay period between overwriting the manifest file and deleting the previous version of the shared data and the data dictionary.

7. The method of claim 1, further comprising:
    generating the data dictionary for the listing object; and
    writing the data dictionary to a local cloud object storage bucket of the source deployment, wherein the data dictionary is accessed from the local cloud object storage bucket.

8. The method of claim 1, wherein the data dictionary for the listing object is generated in response to detecting a privilege grant modification to the listing object.

9. The method of claim 1, further comprising:
    accessing an updated data dictionary generated for the listing object, the updated data dictionary describing updated shared data offered by the listing object;
    identifying the destination deployment to which the listing object is to be replicated;
    writing the updated data dictionary and the updated shared data offered by the listing object to the global cloud object storage bucket associated with the destination deployment; and
    the updated shared data offered by the listing object to the global cloud object storage bucket.

10. The method of claim 1, wherein identifying the destination deployment to which the listing object is to be replicated comprises:
    accessing a region visibility associated with the listing object, the region visibility identifying remote deployment at which the listing object is authorized to offer the shared data.

11. A system comprising
    one or more computer processors; and
    one or more computer-readable mediums storing instructions that, when executed by the one or more computer processors, cause the system to perform operations comprising:
    accessing, at a source deployment, a data dictionary generated for a listing object, the data dictionary describing shared data offered by the listing object;
    identifying a destination deployment to which the listing object is to be replicated;
    writing the data dictionary and the shared data offered by the listing object to a global cloud object storage bucket associated with the destination deployment;
    based on writing the data dictionary and the shared data offered by the listing object to the global cloud object storage bucket, transmitting a notification to the destination deployment, the notification causing the destination deployment to replicate the shared data and the data dictionary at the destination deployment; and
    selectively controlling visibility of the shared data and the data dictionary to consumers at the destination deployment based on a comparison of a deployment location identifier with region information corresponding to the listing object; and
    based on writing an updated data dictionary, transmitting a subsequent notification to the destination deployment, the subsequent notification causing the destination deployment to replicate the updated shared data and the updated data dictionary at the destination deployment.

12. The system of claim 11, wherein the controlling of the visibility is performed by the destination deployment after the shared data and the data dictionary are replicated to the destination deployment, wherein visibility of the shared data and the data dictionary is prevented based on the comparison of the deployment location identifier with the region information corresponding to the listing object.

13. The system of claim 11, wherein the destination deployment uses the shared data and the data dictionary replicated at the destination deployment to provide the shared data offered by the listing object at the destination deployment and a description of the shared data that includes the data dictionary.

14. The system of claim 13, the shared data and the data dictionary replicated at the destination deployment replaces a previous version of the shared data and the data dictionary replicated at the destination deployment.

15. The system of claim 14, wherein the destination deployment replaces the previous version of the shared data and the data dictionary replicated at the destination deployment by overwriting a manifest file associated with the listing object to point to the shared data and the data dictionary replicated at the destination deployment and deletes the previous version of the shared data and the data dictionary replicated at the destination deployment.

16. The system of claim 11, wherein the operations comprise:
accessing a visibility list to retrieve a list of deployment identifiers for which the listing is available to be visible;
determining that the deployment location identifier of the destination deployment is excluded from the visibility list; and
in response to determining that the deployment location identifier is excluded from the visibility list, preventing the consumer associated with the destination deployment from viewing the shared data and the data dictionary of the listing object.

17. The system of claim 11, wherein a plurality of remote deployments are associated with a deployment shard having a common deployment identifier.

18. The system of claim 11, the operations further comprising:
parsing a string of deployment identifiers from available regions to identify a list of regions where data exchange is available for the listing object; and
selecting the destination deployment from a list of destination deployments in response to parsing the string.

19. The system of claim 11, the operations further comprising:
accessing an updated data dictionary generated for the listing object, the updated data dictionary describing updated shared data offered by the listing object;
identifying the destination deployment to which the listing object is to be replicated;
writing the updated data dictionary and the updated shared data offered by the listing object to the global cloud object storage bucket associated with the destination deployment; and
the updated shared data offered by the listing object to the global cloud object storage bucket.

20. The system of claim 11, wherein identifying the destination deployment to which the listing object is to be replicated comprises:
accessing a region visibility associated with the listing object, the region visibility identifying remote deployment at which the listing object is authorized to offer the shared data.

21. A computer-storage medium storing instructions that, when executed by one or more computer processors of one or more computing devices, cause the one or more computing devices to perform operations comprising:
accessing, at a source deployment, a data dictionary generated for a listing object, the data dictionary describing shared data offered by the listing object;
identifying a destination deployment to which the listing object is to be replicated;
writing the data dictionary and the shared data offered by the listing object to a global cloud object storage bucket associated with the destination deployment;
based on writing the data dictionary and the shared data offered by the listing object to the global cloud object storage bucket, transmitting a notification to the destination deployment, the notification causing the destination deployment to replicate the shared data and the data dictionary at the destination deployment; and
selectively controlling visibility of the shared data and the data dictionary to consumers at the destination deployment based on a comparison of a deployment location identifier with region information corresponding to the listing object; and
based on writing an updated data dictionary, transmitting a subsequent notification to the destination deployment, the subsequent notification causing the destination deployment to replicate the updated shared data and the updated data dictionary at the destination deployment.

22. The computer-storage medium of claim 21, wherein the notification is transmitted using a global messaging framework that defines a corresponding processing function to the notification.

23. The computer-storage medium of claim 21, wherein the destination deployment uses the shared data and the data dictionary replicated at the destination deployment to provide the shared data offered by the listing object at the destination deployment and a description of the shared data that includes the data dictionary.

24. The computer-storage medium of claim 23, the shared data and the data dictionary replicated at the destination deployment replaces a previous version of the shared data and the data dictionary replicated at the destination deployment.

25. The computer-storage medium of claim 24, wherein the destination deployment replaces the previous version of the shared data and the data dictionary replicated at the destination deployment by overwriting a manifest file associated with the listing object to point to the shared data and the data dictionary replicated at the destination deployment and deletes the previous version of the shared data and the data dictionary replicated at the destination deployment.

26. The computer-storage medium of claim 25, wherein the destination deployment implements a delay period between overwriting the manifest file and deleting the previous version of the shared data and the data dictionary.

27. The computer-storage medium of claim 21, the operations further comprising:
generating the data dictionary for the listing object; and
writing the data dictionary to a local cloud object storage bucket of the source deployment, wherein the data dictionary is accessed from the local cloud object storage bucket.

28. The computer-storage medium of claim 21, wherein the data dictionary for the listing object is generated in response to detecting a privilege grant modification to the listing object.

29. The computer-storage medium of claim 21, the operations further comprising:
- accessing an updated data dictionary generated for the listing object, the updated data dictionary describing updated shared data offered by the listing object;
- identifying the destination deployment to which the listing object is to be replicated;
- writing the updated data dictionary and the updated shared data offered by the listing object to the global cloud object storage bucket associated with the destination deployment; and
- the updated shared data offered by the listing object to the global cloud object storage bucket.

30. The computer-storage medium of claim 21, wherein identifying the destination deployment to which the listing object is to be replicated comprises:
- accessing a region visibility associated with the listing object, the region visibility identifying remote deployment at which the listing object is authorized to offer the shared data.

\* \* \* \* \*

UNITED STATES PATENT AND TRADEMARK OFFICE
CERTIFICATE OF CORRECTION

PATENT NO. : 11,775,559 B1  
APPLICATION NO. : 17/977817  
DATED : October 3, 2023  
INVENTOR(S) : Arikatla et al.

Page 1 of 1

It is certified that error appears in the above-identified patent and that said Letters Patent is hereby corrected as shown below:

In the Claims

In Column 48, Line 38, in Claim 11, delete "comprising" and insert --comprising:-- therefor Signed and Sealed this  
Thirty-first Day of December, 2024

Derrick Brent  
*Acting Director of the United States Patent and Trademark Office*